(12) United States Patent
Feng et al.

(10) Patent No.: US 10,420,091 B2
(45) Date of Patent: *Sep. 17, 2019

(54) MAPPING OF CONTROL INFORMATION TO CONTROL CHANNEL ELEMENTS

(71) Applicant: Sun Patent Trust, New York, NY (US)

(72) Inventors: Sujuan Feng, Langen (DE); Alexander Golitschek Edler Von Elbwart, Langen (DE); Christian Wengerter, Langen (DE)

(73) Assignee: SUN PATENT TRUST, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/819,202

(22) Filed: Nov. 21, 2017

(65) Prior Publication Data
US 2018/0077694 A1    Mar. 15, 2018

Related U.S. Application Data

(63) Continuation of application No. 15/147,285, filed on May 5, 2016, now Pat. No. 9,877,316, which is a
(Continued)

(30) Foreign Application Priority Data

Apr. 13, 2010 (EP) .................................... 10003913

(51) Int. Cl.
*H04W 72/04* (2009.01)
*H04L 5/00* (2006.01)

(52) U.S. Cl.
CPC ........... *H04W 72/042* (2013.01); *H04L 5/001* (2013.01); *H04L 5/0007* (2013.01);
(Continued)

(58) Field of Classification Search
CPC .................................................. H04W 72/042
See application file for complete search history.

(56) References Cited

U.S. PATENT DOCUMENTS

| 2008/0165893 | A1 | 7/2008 | Malladi et al. |
| 2009/0003274 | A1* | 1/2009 | Kwak ................. H04W 72/042 370/329 |

(Continued)

FOREIGN PATENT DOCUMENTS

| JP | 2010-541462 A | 12/2010 |
| WO | 2008/133415 A1 | 11/2008 |

(Continued)

OTHER PUBLICATIONS

International Search Report for PCT/EP2011/000942 dated Jul. 5, 2011.
(Continued)

*Primary Examiner* — Kevin M Cunningham

(57) ABSTRACT

The invention relates to a new structure of a control channel region within a sub-frame of a 3GPP-based based communication system using OFDM in the downlink. This new structure of a control channel region is inter alia particularly suitable for conveying physical downlink control channel information from a donor eNodeB to a relay node. The control channel region is divided in CCEs that have equal size irrespective of the presence of further cell-specific and/or UE-specific reference signals within the control channel region. This is achieved by dividing the control channel region in plural sub-CCEs that are combined to CCEs all having equal size (in terms of resource elements that can be used for the signaling of control information). The control channel region is divided in the frequency domain and/or time domain in a FDM respectively TDM fashion in order to obtain the sub-CCEs.

14 Claims, 25 Drawing Sheets

Related U.S. Application Data continuation of application No. 14/602,755, filed on Jan. 22, 2015, now Pat. No. 9,420,578, which is a continuation of application No. 13/640,391, filed as application No. PCT/EP2011/000942 on Feb. 25, 2011, now Pat. No. 9,131,490.

(52) U.S. Cl.
CPC .......... *H04L 5/0023* (2013.01); *H04L 5/0048* (2013.01); *H04L 5/0053* (2013.01); *H04W 72/0446* (2013.01)

(56) References Cited

U.S. PATENT DOCUMENTS

| | | | |
|---|---|---|---|
| 2009/0097447 A1* | 4/2009 | Han | ................. H04L 5/0007 370/330 |
| 2009/0238091 A1 | 9/2009 | Kim et al. | |
| 2010/0118800 A1 | 5/2010 | Kim et al. | |
| 2010/0165847 A1 | 7/2010 | Kamuf et al. | |
| 2011/0116455 A1 | 5/2011 | Damnjanovic et al. | |
| 2011/0243090 A1* | 10/2011 | Grovlen | ................. H04L 1/18 370/329 |

FOREIGN PATENT DOCUMENTS

| | | | |
|---|---|---|---|
| WO | 2009/045076 A2 | 4/2009 | |
| WO | 2010/039003 A2 | 4/2010 | |

OTHER PUBLICATIONS

Notice of Reasons for Rejection for JP Application No. 2013-504143 dated Nov. 7, 2014.

"3rd Generation Partnership Project; Technical Specification Group Radio Access Network;Further Advancements for E-UTRA Physical Layer Aspects (Release 9)", 3GPP Draft; TR 36.814 V2.0.0, Mar. 2010.

Extended European Search Report for Application No. 15151107.8-1505/2866375 dated Apr. 29, 2015.

Exteneded European Search Report issued in Application No. EP16 15 1461 dated Mar. 23, 2016.

3GPP TSG RAN WG1 Meeting #60bis, R1-102242, ETRI, "R-PDCCH design" Beijing, China, Apr. 12-16, 2010.

3GPP TSG-RAN WG1 Meeting #60, R1-101446, Nokia Siemens Networks, Nokia, "On DL Backhaul Control Channel Design Aspects", San Francisco, USA, Feb. 22-26, 2010.

3GPP TSG RAN EG1 Meeting #57bis, R1-092375, Huawei, "Considerations on R-PDCCH for Type 1 relays" Los Angeles, USA, Jun. 29-Jul. 3, 2009.

Notice of Reasons for Rejection issued in Japanese patent application No. 2015-229817 dated Aug. 30, 2016.

Panasonic, R-PDCCH placement, 3GPP TSG-RAN WG1 #60b R1-102042, Apr. 6, 2010, pp. 1 to 5.

Panasonic, Control Signalling Placement design for Relay Nodes, 3GPP TSG-RAN WG1 #59 R1-094517, Jan. 13, 2009, pp. 1 to 3.

* cited by examiner

MAPPING OF CONTROL INFORMATION TO CONTROL CHANNEL ELEMENTS

This is a continuation of U.S. patent application Ser. No. 14/602,755 filed Jan. 22, 2015 which is a continuation of U.S. patent application Ser. No. 13/640,391 filed Dec. 3, 2012, which is the national stage of International application PCT/EP2011/000942 filed Feb. 25, 2011, which claims benefit of European Patent application 10003913 filed Apr. 13, 2010, each of which is incorporated herein by reference in its entirety.

FIELD OF THE INVENTION

The invention relates to a new structure of a control channel region within a sub-frame of a 3GPP-based based communication system using OFDM in the downlink. This new structure of a control channel region is inter alia particularly suitable for conveying physical downlink control channel information from a donor eNodeB to a relay node. However, the new structure of a control channel region within a sub-frame may also be used on the air interface between eNodeBs and user equipments as well as the air interface between the eNodeBs and relay nodes.

The invention further provides a method for mapping physical downlink control channel information for a receiving apparatus to control channel elements of a control channel region of a sub-frame of a 3GPP-based based communication system using OFDM in the downlink and to a method for receiving control information for a receiving apparatus of a 3GPP-based communication system using OFDM in the downlink. Moreover, the invention is also related to a transmitting apparatus (e.g. a eNodeB or relay node) and a receiving apparatus (e.g. a relay node or user equipment) that perform the methods.

The invention is inter alia applicable to a 3GPP LTE-A system as standardized by the $3^{rd}$ Generation Partnership Project (3GPP).

TECHNICAL BACKGROUND

3GPP Long Term Evolution (3GPP LTE)

Third-generation mobile systems (3G) based on WCDMA radio-access technology, such as UMTS (Universal Mobile Communications System), are currently deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio-access technology that is highly competitive.

In order to be prepared for further increasing user demands and to be competitive against new radio access technologies 3GPP introduced a new mobile communication system which is called Long Term Evolution (LTE). LTE is designed to meet the carrier needs for high speed data and media transport as well as high capacity voice support to the next decade. The ability to provide high bit rates is a key measure for LTE. The work item (WI) specification on LTE called Evolved UMTS Terrestrial Radio Access (UTRA) and UMTS Terrestrial Radio Access Network (UTRAN) is to be finalized as Release 8 (LTE Rel. 8). The LTE system represents efficient packet-based radio access and radio access networks that provide full IP-based functionalities with low latency and low cost. The detailed system requirements are given in 3GPP TR 25.913, "Requirements for Evolved UTRA (E-UTRA) and Evolved UTRAN (E-UTRAN)," version 8.0.0, January 2009 (available at http://www.3gpp.org and incorporated herein by reference).

Component Carrier Structure in LTE (Release 8)

The downlink component carrier of a 3GPP LTE (Release 8) is subdivided in the time-frequency domain in so-called sub-frames. In 3GPP LTE (Release 8) each sub-frame is divided into two downlink slots as shown in FIG. 1, wherein the first downlink slot comprises the control channel region (PDCCH region) within the first OFDM symbols. Each sub-frame consists of a give number of OFDM symbols in the time domain (12 or 14 OFDM symbols in 3GPP LTE (Release 8)), wherein each of OFDM symbol spans over the entire bandwidth of the component carrier. The sub-frames thus each consist of a number of $2 \cdot N_{symb}^{DL}$ modulation symbols transmitted on respective $N_{RB}^{DL} \times N_{sc}^{RB}$ subcarriers as also shown in FIG. 2.

Assuming a multi-carrier communication system, e.g. employing OFDM, as for example used in 3GPP Long Term Evolution (LTE), the smallest unit of resources that can be assigned by the scheduler is one "resource block" (or "physical resource block", abbreviated PRB). A physical resource block is defined as $N_{symb}^{DL}$ consecutive OFDM symbols in the time domain and $N_{sc}^{RB}$ consecutive subcarriers in the frequency domain as exemplified in FIG. 2. In praxis, the downlink resources are assigned in resource block pairs (or physical resource block (PRB) pairs). A resource block pair consists of two resource blocks on the same subcarriers of the sub-frame, i.e. spans $N_{sc}^{RB}$ consecutive subcarriers in the frequency domain and the entire $2 \cdot N_{symb}^{DL}$ modulation symbols of the sub-frame in the time domain. $N_{symb}^{DL}$ may be either 6 or 7, so that a sub-frame has either 12 or 14 OFDM symbols in total.

In 3GPP LTE (Release 8), a physical resource block thus consists of $N_{symb}^{DL} \times N_{sc}^{RB}$ resource elements, corresponding to one slot in the time domain and 180 kHz in the frequency domain (for further details on the downlink resource grid, see for example 3GPP TS 36.211, "Evolved Universal Terrestrial Radio Access (E-UTRA); Physical Channels and Modulation (Release 8)", version 8.9.0, December 2009 section 6.2, available at http://www.3gpp.org and incorporated herein by reference).

The value NR depends on the downlink transmission bandwidth configured in the cell and shall fulfill the relation $N_{RB}^{min,DL} \leq N_{RB}^{DL} \leq N_{RB}^{max,DL}$. Presently, $N_{RB}^{min,DL} = 6$ and $N_{RB}^{max,DL} = 110$ and represent the smallest and largest downlink bandwidths, respectively, supported by the current version of the specifications in 3GPP LTE (Release 8) and 3GPP LTE-A (Release 10)—see below. $N_{SC}^{RB}$ is the number of subcarriers within one resource block. For a normal cyclic prefix sub-frame structure, $N_{SC}^{RB} = 12$ and $N_{symb}^{DL} = 7$ in the current versions of the 3GPP specifications for 3GPP LTE (Release 8) and 3GPP LTE-A (Release 10).

In MBSFN operation, the user equipment receives and combines synchronized signals from multiple cells. In order for MBSFN reception, the user equipment performs a separate channel estimation based on MBSFN Reference Signal (MBSFN RS). In order to avoid mixing MBSFN RS and other reference signals (RSs) in the same sub-frame, certain sub-frames, known as MBSFN sub-frames, are reserved for MBSFN transmission.

Up to two of the first OFDM symbols within a sub-frame are reserved for non-MBSFN transmission and the remaining OFDM symbols are used for MBSFN transmission. In the first up to two OFDM symbols, PDCCH for uplink resource assignments and PHICH can be transmitted, and the cell specific reference signal is the same as non-MBSFN sub-frames.

The pattern of MBSFN sub-frames in one cell is broadcasted in the System Information (SI) of the cell. UEs, that are not capable of receiving MBSFN, will decode the first up to two OFDM symbols and ignore the remaining OFDM symbols.

MBSFN sub-frame configuration supports both 10 ms and 40 ms periodicity. And sub-frames #0, #4, #5 and #9 cannot be configured as MBSFN sub-frames.

General Structure for Downlink Physical Channels

The general downlink 3GPP LTE (Release 8) baseband signal processing according to 3GPP TS 36.211 section 6.3 is exemplarily shown in FIG. 6. Further details on the LTE downlink can be found in 3GPP TS 36.211, section 6. A block of coded bits is first scrambled. Up to two code words can be transmitted in one sub-frame.

In general, scrambling of coded bits helps to ensure that receiver-side decoding can fully utilize the processing gain provided by channel code. For each codeword, by applying different scrambling sequence for neighboring cells, the interfering signals are randomized, ensuring full utilization of the processing gain provided by the channel code. The scrambled bits are transformed to a block of complex modulation symbols using the data modulator for each codeword. The set of modulation schemes supported by LTE downlink includes QPSK, 16-QAM and 64-QAM corresponding to 2, 4 or 6 bits per modulation symbol.

Layer mapping and precoding are related to MIMO applications. The complex-valued modulation symbols for each of the code words to be transmitted are mapped onto one or several layers. LTE supports up to four transmit antennas. The antenna mapping can be configured in different ways to provide multi antenna schemes including transmit diversity, beam forming, and spatial multiplexing. Further the resource block mapper maps the symbols to be transmitted on each antenna to the resource elements on the set of resource blocks assigned by the scheduler for transmission. The selection of resource blocks depends on the channel quality information.

Downlink control signaling is carried out by three physical channels:
PCFICH to indicate the number of OFDM symbols used for control signaling in a sub-frame (i.e. the size of the control channel region)
PHICH which carries downlink ACK/NACK associated with UL data transmission
PDCCH which carries downlink scheduling assignments and uplink scheduling assignments.

Downlink Reception in 3GPP LTE

In 3GPP LTE (Release 8), where there is only once component carrier in uplink and downlink, the PCFICH is sent at a known position within the control signaling region of a downlink sub-frame using a known modulation and coding scheme. As the determination of the downlink resources assigned to the user equipment depends on the size of the control signaling region of the sub-frame, i.e. the number of OFDM symbols used for control signaling in the given sub-frame, the user equipments needs to decode the PCFICH in order to obtain the signaled PCFICH value, i.e. the actual number of OFDM symbols used for control signaling in the sub-frame.

If the user equipment is unable to decode the PCFICH or obtains an erroneous PCFICH value, this PCFICH detection error will result in the user equipment not being able to correctly decode the L1/L2 control signaling (PDCCHs) comprised in the control signaling region, so that all resource assignments contained therein are lost.

Physical Downlink Control Channel (PDCCH) and Physical Downlink Shared Channel (PDSCH)

The physical downlink control channel (PDCCH) carries scheduling grants for allocating resources for downlink or uplink data transmission. Each scheduling grant is defined based on Control Channel Elements (CCEs). Each CCE corresponds to a set of Resource Elements (REs). In 3GPP LTE, one CCE consists of 9 Resource Element Groups (REGs), where one REG consists of four consecutive REs (in the frequency domain) excluding potential REs of reference signals.

The PDCCH for the user equipments is transmitted on the first $N_{symb}^{PDCCH}$ OFDM symbols (either 1, 2 or 3 OFDM symbols as defined by the PCFICH) within a sub-frame. The region occupied by the $N_{symb}^{PDCCH}$ in the time domain and the $N_{RB}^{DL} \times N_{sc}^{RB}$ subcarriers in the frequency domain is also referred to as PDCCH region or control channel region. The remaining $N_{symb}^{PDSCH} = 2 \cdot N_{symb} - N_{symb}^{PDCCH}$ OFDM symbols in the time domain on the $N_{RB}^{DL} \times N_{sc}^{RB}$ subcarriers in the frequency domain is referred to as the PDSCH region or shared channel region (see below).

For a downlink grant on the physical downlink shared channel (PDSCH), the PDCCH assigns a PDSCH resource for (user) data within the same sub-frame. The PDCCH control channel region within a sub-frame consists of a set of CCE where the total number of CCEs in the control region of sub-frame is distributed throughout time and frequency control resource. Multiple CCEs can be combined to effectively reduce the coding rate of the control channel. CCEs are combined in a predetermined manner using a tree structure to achieve different coding rate.

In 3GPP LTE, a PDCCH can aggregate 1, 2, 4 or 8 CCEs. The number of CCEs available for control channel assignment is a function of several factors, including carrier bandwidth, number of transmit antennas, number of OFDM symbols used for control and the CCE size, etc. Multiple PDCCHs can be transmitted in a sub-frame.

On a transport channel level, the information transmitted via the PDCCH is also refereed as L1/L2 control signaling. L1/L2 control signaling is transmitted in the downlink for each user equipment (UE). The control signaling is commonly multiplexed with the downlink (user) data in a sub-frame (assuming that the user allocation can change from sub-frame to sub-frame). Generally, it should be noted that user allocation might also be performed on a TTI (Transmission Time Interval) basis where the TTI length (in the time domain) is equivalent to either one or multiple sub-frames. The TTI length may be fixed in a service area for all users, may be different for different users, or may even by dynamic for each user. Generally, then the L1/L2 control signaling needs only be transmitted once per TTI.

Furthermore, the PDCCH information sent on the L1/L2 control signaling may be separated into the Shared Control Information (SCI) and Dedicated Control Information (DCI).

The physical downlink shared channel (PDSCH) is mapped to the remaining OFDM symbols within one sub-frame that are not occupied by the PDCCH. The PDSCH resources are allocated to the user equipments in units of resource blocks for each sub-frame.

FIG. 8 shows the exemplary mapping of PDCCH and PDSCH within a normal sub-frame (having $2 \cdot N_{symb} = 14$ OFDM symbols in the time domain), respectively a resource block pair (see magnification). The first $N_{symb}^{PDCCH} = 2$ OFDM symbols (PDCCH region) are used for L1/L2 control signaling, i.e. for signaling the PDCCH, and the remaining $N_{symb}^{PDSCH} = 12$ OFDM symbols (PDSCH region) are used for data. Within the resource block pairs of all sub-frames, cell-specific reference signals, CRS (Common Reference Signal), are transmitted. These cell-specific reference signals are transmitted on one or several of antenna ports 0 to 3. In this example, the CRS are transmitted from two antenna ports: R0 is from antenna port 0 and R1 is from antenna port 1.

Furthermore, the sub-frame also contains UE specific reference signals, DM-RS (DeModulation Reference Signal) that are used by the user equipments for demodulating the PDSCH. The DM-RS are only transmitted within the resource blocks where the PDSCH for a certain user equipment is allocated. In order to support MIMO (Multiple Input Multiple Output) with DM-RS, four DM-RS layers are defined, which means at most MIMO of four layers is supported. In the example of FIG. 8, DM-RS layer 1, 2, 3, are 4 are corresponding to MIMO layer 1, 2, 3, and 4.

FIG. 9 shows another example where the PDCCH and the PDSCH is mapped to a MBSFN sub-frame. The example of FIG. 8 is quite similar to FIG. 8, except for the MBSFN sub-frame not comprising common reference signals.

For further information on the LTE physical channel structure in downlink and the PDSCH and PDCCH format, see St. Sesia et al., "LTE—The UMTS Long Term Evolution", Wiley & Sons Ltd., ISBN 978-0-47069716-0, April 2009, sections 6 and 9. Additional information on the use of reference signals and channel estimation in 3GPP LTE can be found in section 8 of this book.

Further Advancements for LTE—LTE-Advanced (3GPP LTE-A)

The frequency spectrum for IMT-Advanced was decided at the World Radio communication Conference 2007 (WRC-07) in November 2008. Although the overall frequency spectrum for IMT-Advanced was decided, the actual available frequency bandwidth is different according to each region or country. Following the decision on the available frequency spectrum outline, however, standardization of a radio interface started in the 3rd Generation Partnership Project (3GPP). At the 3GPP TSG RAN #39 meeting, the Study Item description on "Further Advancements for E-UTRA (LTE-Advanced)" was approved which is also referred to as "Release 10". The study item covers technology components to be considered for the evolution of E-UTRA, e.g. to fulfill the requirements on IMT-Advanced. Two major technology components which are currently under consideration for LTE-A are described in the following.

In order to extend the overall system bandwidth, LTE-A (Release 10) uses carrier aggregation, where two or more component carriers as defined for LTE (Release 8)—see FIG. 1 and FIG. 2 discussed above—are aggregated in order to support wider transmission bandwidths e.g. up to 100 MHz and for spectrum aggregation. It is commonly assumed that a single component carrier does not exceed a bandwidth of 20 MHz.

A terminal may simultaneously receive and/or transmit on one or multiple component carriers depending on its capabilities:

An LTE-Advanced (Release 10) compatible mobile terminal with reception and/or transmission capabilities for carrier aggregation can simultaneously receive and/or transmit on multiple component carriers. There is one Transport Block (in absence of spatial multiplexing) and one HARQ entity per component carrier.

An LTE (Release 8) compatible mobile terminal can receive and transmit on a single component carrier only, provided that the structure of the component carrier follows the Release 8 specifications.

It is also envisioned to configure all component carriers LTE (Release 8)-compatible, at least when the aggregated numbers of component carriers in the uplink and the downlink are same. Consideration of non-backward-compatible configurations of LTE-A (Release 10) component carriers is not precluded. Accordingly, it will be possible to configure a user equipment to aggregate a different number of component carriers of possibly different bandwidths in the uplink and the downlink.

Relaying Functionality—

Introduction of Relay Nodes to the UTRAN Architecture of 3GPP LTE-A

Relaying is considered for LTE-A as a tool to improve e.g. the coverage of high data rates, group mobility, temporary network deployment, the cell-edge throughput and/or to provide coverage in new areas.

The relay node is wirelessly connected to radio-access network via a donor cell. Depending on the relaying strategy, a relay node may be part of the donor cell or may control cells of its own. In case the relay node is part of the donor cell, the relay node does not have a cell identity of its own (but may still have a relay ID). In the case the relay node is in control of cells of its own, the relay node controls one or several cells and a unique physical-layer cell identity is provided in each of the cells controlled by the relay.

At least "Type 1" relay nodes will be part of 3GPP LTE-A. A "type 1" relay node is a relaying node characterized by the following:

The relay node controls cells, each of which appears to a user equipment as a separate cell distinct from the donor cell.

The cells should have its own Physical Cell ID (defined in 3GPP LTE (Release 8)) and the relay node shall transmit its own synchronization channels, reference symbols, etc.

In the context of single-cell operation, the user equipment should receive scheduling information and HARQ feedback directly from the relay node and send its control channels (SR/CQI/ACK) to the relay node The relay node should appear as a 3GPP LTE-compliant eNodeB to 3GPP LTE-compliant user equipments (i.e. be backwards compatible)

To 3GPP LTE-A-compliant user equipment, a "type 1" relay node should appear differently than 3GPP LTE-compliant eNodeB to allow for further performance enhancement.

An exemplary network structure using relay nodes in 3GPP LTE-A is shown in FIG. 3. The link between donor eNodeB (d-eNB) and relay node is also referred to as relay backhaul link. The link between relay node and user equipments attached to the relay node (r-UEs) is called relay access link.

Propagation Delay Between Node B and Relay Node

In the following, a network configuration as shown in FIG. 3 is assumed for exemplary purposes. The donor eNode B transmits L1/L2 control and data to a so-called macro-user equipment (UE1) and also to a relay (relay node), and the relay node transmits L1/L2 control and data to a so-called relay-user equipment (UE2).

Further assuming that the relay node operates in a time-duplexing mode, i.e. transmission and reception operation are not performed at the same time, we arrive at a non-exhaustive entity behavior over time as shown in FIG. 4. Whenever the relay node is in "transmit" mode, UE2 needs to receive the L1/L2 control channel and physical downlink shared channel (PDSCH), while when the relay node is in "receive" mode, i.e. it is receiving L1/L2 control channel and PDSCH from the Node B, it cannot transmit to UE2 and therefore UE2 cannot receive any information from the relay node in such a sub-frame.

The situation becomes somewhat trickier in case that the UE2 is not aware that it is attached to a relay node. As will be understood by those skilled in the art, in a communication system without relay node any user equipment can always assume that at least the L1/L2 control signal is present in every sub-frame.

In order to support such a user equipment in operation beneath a relay node, the relay node should therefore pretend such an expected behavior in all sub-frames. This leads to a behavior as shown in FIG. 5. The relay node has to transmit the L1/L2 control channel in each sub-frame (here assumed to be in the early part of each sub-frame), before it can switch to reception mode. Additionally shown is a "Gap" which is required to tune the relay node hardware and software from "transmit" to "receive" mode and vice versa, which is typically a fraction of a sub-frame. What can be seen is that effectively the time that is available for transmission from a Node B to a relay node is actually only a fraction of a sub-frame, as indicated in the figure by the dashed box. In 3GPP Release 8, the UE2 behavior shown for sub-frame 2, i.e. to receive only the first part identical to the L1/L2 control signaling, can be achieved by configuring that sub-frame as an "MBSFN sub-frame". Since this is done mainly to tell the UE2 to not process or expect the remainder of that sub-frame, it is also sometimes called a "fake MBSFN sub-frame". In LTE, a node transmitting such "fake MBSFN" sub-frames is required to transmit the first two OFDM symbols of such a sub-frame before it can switch to reception.

As shown in FIG. 6, it can be usually assumed that more than a single relay node is deployed and connected to a Node B. In addition, it is possible that the relay node is not stationary, but can be mobile as a user equipment. For example, a relay node can be installed in a public transportation vehicle such as a bus, train, or tramway. In any case, the distance between Node B and at least one relay node is variable, so that different propagation delay for the signal from Node B to relay nodes will occur.

Using the exemplary deployment of FIG. 6, FIG. 7 illustrates the situation assuming that the relay nodes' transmission is synchronized to the Node B's transmission, as it is for example beneficial for the case that a user equipment should easily hand over between the Node B and a relay node or for simultaneous multipoint transmission purposes. For the first two OFDM symbols of the fake MBSFN sub-frame, Node B, RN1, and RN2 transmit simultaneously. Then for the relay nodes the first gap is required to switch to reception mode, followed by reception of the Node B transmission signal until just before the end of the sub-frame, where the second gap is required by the relay nodes to switch back again to transmission mode before the beginning of the next sub-frame.

As can be seen, depending on the length of the gaps and propagation delay for the signal between Node B and RN1 and between Node B and RN2, a relay node will be able to see only a limited and at least partially different set of OFDM symbols transmitted by the Node B. For RN1, the reception of OFDM symbol #1 overlaps with the gap, as does the reception of OFDM symbol #12. For RN2, the reception of OFDM symbol #2 overlaps with the gap, as does the reception of OFDM symbol #13. While RN1 can see OFDM symbols #2 to #11 completely, RN2 can see OFDM symbols #3 to #12 completely. Assuming a simple and cost-effective receiver at the relay node, partially invisible OFDM symbols cannot be used since they would contain a lot of interference and should therefore be considered as corrupt.

It may be thus assumed that the relay node is not able to detect the early part of a sub-frame transmitted by a Node B, which usually carries L1/L2 control information. Therefore, the Node B of transmitting to the relay node may use only those OFDM symbols within a R-PDCCH region within a sub-frame for conveying the L1/L2 control information to the relay node that can be received by the relay node.

Relay Backhaul Sub-Frames

If the eNodeB-to-relay node link operates in the same frequency spectrum as the relay node-to-UE link, simultaneous eNodeB-to-relay node and relay node-to-UE transmissions on the same frequency resource may not be feasible due to the relay transmitter causing interference to its own receiver, unless sufficient isolation of the outgoing and incoming signals is provided. Therefore, when relay node transmits to donor eNodeB (d-eNB), it cannot receive signals from the user equipments attached to the relay node (r-UEs). Likewise, when relay node receives from donor eNodeB (d-eNB), it cannot transmit to user equipments attached to the relay (r-UEs), as has been explained above with respect to FIG. 4 and FIG. 5.

Thus, there is sub-frame partitioning between relay backhaul link (eNodeB-to-relay node link) and relay access link (relay node-to-UE link). Currently it has been agreed that:

Relay backhaul downlink sub-frames, during which eNodeB to relay node downlink backhaul transmission may occur, are semi-statically assigned.

Relay backhaul uplink sub-frames, during which relay node to eNodeB uplink backhaul transmission may occur, are semi-statically assigned or implicitly derived by HARQ timing from relay backhaul downlink sub-frames.

In relay backhaul downlink sub-frames, the relay node will transmit to the donor eNodeB and r-UEs are not supposed to expect any relay transmission. In order to support backward compatibility for r-UEs, the relay node configures the backhaul downlink sub-frames as MBSFN sub-frame. As shown in FIG. 5, the relay backhaul downlink sub-frame consists of two parts. In the first OFDM symbols (up to two), the relay node transmits to r-UEs as it would do for a normal MBSFN sub-frame. In the remaining part of the sub-frame, relay receives from donor eNodeB, so there is no relay node to r-UE transmission in this part of the sub-frame. r-UEs receive the first OFDM symbols (up to two) and ignore the rest part of the sub-frame.

MBSFN sub-frame can be configured for every 10 ms and 40 ms. Hence, relay backhaul downlink sub-frames also support both 10 ms and 40 ms configuration. Also similar to the MBSFN sub-frame configuration, relay backhaul downlink sub-frames cannot be configured at sub-frames #0, #4, #5 and #9. Those sub-frames that are not allowed to be configured as backhaul downlink sub-frames are called "illegal downlink sub-frames" here.

Relay downlink backhaul sub-frames can be normal sub-frames (as exemplified in FIG. 8) or MBSFN sub-frames (as exemplified in FIG. 9).

Relay Backhaul R-PDCCH Region

As outlined with respect to FIG. 5 and FIG. 7 above, the relay node cannot receive L1/L2 control information (PDCCH) from donor eNodeB within the first OFDM symbols of the sub-frame. Thus, a new physical control channel (R-PDCCH) is used to dynamically or "semi-persistently" assign resources within the semi-statically assigned sub-frames to the relay node for the downlink and uplink backhaul data. The R-PDDCH(s) for the relay node is/are mapped to a R-PDCCH region within the PDSCH region of the sub-frame. The relay node expects to receive R-PDCCHs within this region of the sub-frame. In time domain, the R-PDCCH region spans the configured downlink backhaul sub-frames. In frequency domain, the R-PDCCH region exists on certain resource blocks that are configured for the relay node by higher layer signaling.

R-PDCCH has following characteristics:
- Within the physical resource blocks (PRBs) semi-statically assigned for R-PDCCH transmission, a subset of the resources is used for each R-PDCCH. The actual overall set of resources used for R-PDCCH transmission within the above mentioned semi-statically assigned PRBs may vary dynamically between sub-frames.
- These resources may correspond to the full set of OFDM symbols available for the backhaul link or be constrained to a subset of these OFDM symbols.
- The resources that are not used for R-PDCCH within the above mentioned semi-statically assigned PRBs may be used to carry R-PDSCH or PDSCH.
- The R-PDCCH is transmitted starting from an OFDM symbol within the sub-frame that is late enough so that the relay can receive it.
- Both frequency distributed and frequency localized R-PDCCH placement are supported.
- Interleaving of R-PDCCHs within limited number of PRBs can have diversity gain and at the same time limit the number of PRBs that could be wasted.
- In normal sub-frames, 3GPP LTE-A DM-RS (DeModulation Reference Signal) is used when DM-RS are configured by eNodeB, otherwise 3GPP LTE CRS (Common Reference Signal) is used.
- In MBSFN sub-frames, 3GPP LTE-A DM-RS is used.

The mapping of the R-PDCCH control information to the R-PDCCH region within the PDSCH region of the backhaul downlink sub-frames is one of the topics discussed in 3GPP RAN1 working group.

SUMMARY OF THE INVENTION

One object of the invention is to suggest mapping of control information for a relay node to a control channel region defined for this relay node within a sub-frame of an OFDM-based communication system. Another object of the invention is to define a structure of this control channel region that allows for a distributed and localized mapping of control information to the control channel region and/or that allows to minimize the resources of the control channel region that need to be allocated to a user equipment.

The object is solved by the subject matter of the independent claims. Advantageous embodiments of the invention are subject to the dependent claims.

A first aspect of the invention is to suggest a new organization of a control channel region that is to carry control information. According to this aspect of the invention the control channel region is divided in control channel elements that have equal size irrespective of the presence of further cell-specific and/or UE-specific reference signals within the control channel region. This is achieved by dividing the control channel region in plural sub-control channel elements that are combined to control channel elements all having equal size (in terms of resource elements that can be used for the signaling of control information, where a resource element is defined as one subcarrier in the frequency domain and one ODFM symbol in the time domain).

The control channel region is divided in the frequency domain and/or time domain in a FDM respectively TDM fashion in order to obtain the sub-control channel elements. For example, the OFDM symbols of the control channel region may be divided into two groups, while in the frequency domain the control channel region is divided every three subcarriers. The resource elements of the respective blocks of three subcarriers and the OFDM symbols of a respective one of the two groups of OFDM symbols form the sub-control channel elements.

The control channel region may span plural resource block pairs of the sub-frame, and depending on the number of control channel elements required for transmitting the control information to be signaled on the physical resources of the control channel region and its mapping mode (localized or distributed), sub-control channel elements of the same or different resource block pairs are combined to form the control channel elements. Furthermore, a distributed mapping of the control information may also be realized by mapping the control information to control channel elements of different resource block pairs, while each of the control channel elements themselves are formed by sub-control channel elements of one resource block pair only.

As will become apparent from the following in more detail, the principles of this invention may be used for the signaling of physical control channel information from a base station (donor eNodeB) to relay nodes, from a base station (eNodeB) to mobile terminals (user equipments) and from a relay node to mobile terminals (user equipments). Accordingly, it will be referred to transmitting the control information from a "transmitting apparatus" (i.e. base station or relay node) to a "receiving apparatus" (i.e. relay node or mobile terminal) herein.

According to one exemplary embodiment of the invention, a control channel region within a sub-frame of a 3GPP-based based communication system using OFDM in the downlink is defined. The control channel region consists of at least two physical resource block pairs comprising reference signals in a plurality of the resource elements of the at least two physical resource block pairs. The physical resource block pairs of the control channel region are divided into control channel elements in the following fashion: Each of the physical resource block pairs of the control channel region is divided into a plurality of distinct sub-control channel elements by frequency division and/or time division (e.g. in a FDM, TDM or FDM/TDM fashion). The sub-control channel elements have different sizes and are combined to form control channel elements of equal size for conveying physical downlink control channel information.

In a further embodiment of the invention, the sub-control channel elements have either $k_1$ or $k_2$ resource elements for conveying the physical downlink control channel information (i.e. not counting the reference symbols comprised in the respective sub-control channel element). Each control channel element is formed by a combination of n sub-control channel element)s) having $k_1$ resource elements for conveying the physical downlink control channel information and n sub-control channel element)s) having $k_2$ resource elements for conveying the physical downlink control channel information, where n is a natural number ($n \in \mathbb{N}$ and $n>0$). In one example, the control channel elements are formed by pairs of sub-control channel elements of size $k_1$ and $k_2$ resource elements.

A further, more specific exemplary embodiment of the invention is dividing the control channel region in frequency and time domain in order to obtain the sub-control channel elements, and pairs of the sub-control channel elements form respective control channel elements. Also in this exemplary embodiment, a control channel region within a sub-frame of a 3GPP-based based communication system using OFDM in the downlink is assumed. The control channel region spans $N_{symb}^{R-PDCCH}$ OFDM symbols in the time domain and consists of at least two physical resource block pairs. The resource block pairs comprise reference signals in a plurality of the resource elements and are divided control channel elements for conveying physical downlink control channel information as follows: Each of the plural physical resource block pairs of the control channel region is divided into $2 \cdot N_{SC}/N_{SC}^{CCE}$ sub-control channel elements. $N_{SC}^{CCE} > 1$ and is denoting the number of subcarriers of each of the sub-control channel elements within the respective physical resource block pair.

The sub-control channel elements is divided into two groups: a first group of the sub-control channel elements within a respective physical resource block pair consists of $N_{SC}/N_{SC}^{CCE}$ of the sub-control channel elements and the sub-control channel elements of the first group span a first subset of said $N_{symb}^{R-PDCCH}$ OFDM symbols in the time domain, and a second group of the sub-control channel elements within a respective physical resource block pair consists of the remaining $N_{SC}/N_{SC}^{CCE}$ of the sub-control channel elements and the sub-control channel elements of the second group span another, second subset of said $N_{symb}^{R-PDCCH}$ OFDM symbols in the time domain. Furthermore, respective control channel elements of equal size are formed by pairs of sub-control channel elements, each control channel element consisting of a sub-control channel element of the first group and a sub-control channel element of the second group.

(In this embodiment, $$N_{SC}/N_{SC}^{CCE} \cdot \frac{N_{RB}^{R-PDCCH}}{2} = N_{CCE}$$

can be considered the target number of control channel elements within the control channel region, where $N_{RB}^{R-PDCCH}$ is the number of resource blocks in the control channel region. $N_{SC}^{CCE}$ should be chosen so that equal number of subcarriers are contained in each sub-control channel element, i.e. $N_{SC}$ mod $N_{SC}^{CCE}=0$)

In a more detailed exemplary embodiment, the sub-control channel elements in the first group have different numbers of resource elements for conveying the physical downlink control channel information (i.e. that can be used for carrying the control information and are not required for reference signals), and the sub-control channel elements in the second group have different numbers of resource elements for conveying the physical downlink control channel information.

For example, the sub-control channel elements in the first group have either $k_1$ or $k_2$ resource elements for conveying the control information, and the sub-control channel elements in the second group have either $l_1$ or $l_2$ resource elements for conveying the control information, wherein $k_1+l_2=k_2+l_1$ and where $k_1 \neq k_2$ and $l_1 \neq l_2$.

In a further embodiment of the invention, that is applicable to a control channel region where sub-control channel elements are formed by frequency division and/or time division, the sub-frame has two slots, each slot spanning $N_{symb}$ OFDM symbols in the time domain. In this embodiment of the invention, the sub-control channel elements span either $N_{symb}-N_{symb}^{PDCCH}$ OFDM symbols in the first slot of the sub-frame in the time domain, or the $N_{symb}$ OFDM symbols of the second slot of the sub-frame in the time domain, where $N_{symb}^{PDCCH} \in [0, \ldots, 4]$ and $N_{symb}^{PDCCH} < N_{symb}$.

The number $N_{symb}^{PDCCH}$ may be for configured on a dynamic basis (e.g. corresponding to the PCFICH value signaled in each sub-frame), semi-static basis (e.g. configured by radio resource control signaling or by means of system information broadcast) or static basis (e.g. predefined).

In one further exemplary embodiment of the invention, it is exemplarily assumed that the first $N_{symb}^{PDCCH} \in [0, \ldots, 4]$ OFDM symbols of each sub-frame is defining a physical downlink control channel region (PDCCH region), while the remaining OFDM symbols of the sub-frame are defining a shared data region (or physical downlink shared channel (PDSCH) region). In this scenario, the control channel region may be for example located in a PDSCH region of the sub-frame.

Alternatively, in another embodiment of the invention, the sub-frames may not comprise a PDCCH region, but the time-frequency resources of the sub-frame can be dedicated for control signaling or transmission of user data on a dynamic basis or semi-static basis. In this example, a transmitting apparatus may configure a control channel region for respective receiving apparatuses in which the respective receiving apparatuses can expect to receive its control signaling. For example, the control channel regions may overlap or may be identical for some or all receiving apparatuses.

In a further exemplary embodiment, the sub-control channel elements of each pair of sub-control channel elements forming a control channel element may be located on different subcarriers.

Furthermore, in some embodiments of the invention, the sub-control channel elements each comprise at least one resource element used for sending a demodulation reference signal and/or a common reference signal.

Other embodiments of the invention provide a method for mapping physical downlink control channel information for a receiving apparatus to control channel elements of a control channel region of a sub-frame of a 3GPP-based based communication system using OFDM in the downlink. According to one exemplary embodiment, the transmitting apparatus assigns to a receiving apparatus a control channel region within sub-frames for signaling control information to the receiving apparatus. The assigned control channel region is spanning plural physical resource block pairs consisting each of a plurality of $N_{SC}$ subcarriers in the frequency domain and $N_{symb}^{R-PDCCH}$ OFDM symbols in the time domain. The control channel region has a structure according to one of the different embodiments of the invention described herein. Furthermore, the transmitting apparatus maps the physical downlink control channel information for the receiving apparatus to the control channel elements defined in the control channel region.

In one more detailed, exemplary implementation the physical downlink control channel information is mapped to $2^i$ of the control channel elements defined in the control channel region, wherein $i \in \{0,1,2,3, \ldots \}$. Please note that $2^i$ should be smaller or equal to the number of control channel elements available. In one example, $i \in \{0,1,2,3\}$, in another example, $i \in \{0,1,2,3,4\}$.

As mentioned already above, the principles of the invention facilitate a localized and distributed mapping of the physical downlink control channel information to the control channel region. Basically, the localized mapping ensures that the control channel elements, to which the physical downlink control channel information is mapped, are within one of the resource block pairs. If more control channel elements than available in a single resource block pair are required for the physical downlink control channel information, the physical downlink control channel information is mapped to control channel elements of multiple physical resource block pairs. The multiple physical resource block pairs may be located adjacent to each other in the frequency domain, but may also be distributed the frequency domain. In a distributed mapping the physical downlink control channel information is mapped to control channel elements of non-adjacent physical resource block pairs.

In one exemplary implementation, in case the physical downlink control channel information is to be mapped to one control channel element and in case of using a localized mapping scheme for mapping the physical downlink control channel information to the one control channel element, the pair of sub-control channel elements forming the one control channel element are located in one of the resource blocks of the control channel region. In case the control information is to be mapped to one control channel element and in case of using a distributed mapping scheme for mapping the physical downlink control channel information to the one control channel element, the respective sub-control channel elements of said pair of sub-control elements forming the control channel elements are located in different resource blocks of the control channel region.

In another exemplary implementation, in case the control information is to be mapped to more than one control channel element and in case of using a localized mapping scheme for mapping the physical downlink control channel information to the control channel elements, the respective pairs of sub-control channel elements forming the control channel elements are located in one of the physical resource block pairs of the control channel region.

In case the control information is to be mapped to more than one control channel element and in case of using a distributed mapping scheme for mapping the physical downlink control channel information to the one control channel element:
- the respective control channel elements to which the physical downlink control channel information of the receiving apparatus is mapped are located in different physical resource block pairs, or
- the control channel elements to which the physical downlink control channel information of the receiving apparatus is mapped are respectively formed by sub-control channel elements located in different physical resource block pairs.

According to another exemplary embodiment, the transmitting apparatus generates a sub-frame comprising the physical downlink control channel information for the receiving apparatus mapped to the control channel region and transmitting the sub-frame to the receiving apparatus.

In some embodiments of the invention, the receiving apparatus may use blind detection of the physical downlink control channel information. In order to address the physical downlink control channel information to a receiving apparatus, the transmitting apparatus determines a CRC code for the physical downlink control channel information for the receiving apparatus, and masks the CRC code with a receiving apparatus-specific identifier. The transmitting apparatus further appends the masked CRC code to the physical downlink control channel information for the receiving apparatus within a CRC field. The transmitting apparatus further maps the coded physical downlink control channel information for the receiving apparatus to one or more control channel elements of the control channel region together with the CRC field comprising the masked CRC code.

Other embodiments of the invention relate to the definition of the control channel region (i.e. the physical resources within the sub-frame that span same). The physical resource block pairs for signaling the physical control channel information to the receiving apparatus may be:
- configured by the transmitting apparatus by means of radio resource control signaling,
- configured by the transmitting apparatus by means of system information broadcast in the radio cell of the transmitting apparatus, and/or
- pre-determined (e.g. as part of a standardization document).

In one exemplary implementation, the transmitting apparatus is signaling to the receiving apparatus a control channel assignment message for configures the one or more physical resource block pairs for signaling the control channel region to the receiving apparatus. The control channel assignment message may be a Radio Resource Control message or an Information Element of a Radio Resource Control message. In another embodiment of the invention, the transmitting apparatus broadcasts system information comprising a control channel assignment for configuring the one or more physical resource block pairs for signaling the control channel region to the receiving apparatus.

The control channel assignment message configures the physical resource block pairs for signaling the physical control channel information to the receiving apparatus on a semi-static basis or on a dynamic basis. Furthermore, if the control channel region is not to span a predetermined region in the time domain (e.g. up to a slot boundary in the sub-frame, entire shared data region within the sub-frame, etc.), the control channel assignment message may also indicate the OFDM symbols that belong to the control channel region (for example by sending a start index and/or end index of the OFDM symbol(s) that define the start/end of the control channel region in the time domain).

Furthermore, it is also possible that the same control channel region or partly overlapping control channel regions is/are assigned to plural receiving apparatuses, including the receiving apparatus.

In one further exemplary embodiment of the invention, the transmitting apparatus may modulate the information of the control channel element(s) conveying the physical downlink control channel information for the receiving apparatus using a pre-determined modulation and coding scheme.

Further embodiments of the invention relate to a method for receiving control information for a receiving apparatus of a 3GPP-based communication system using OFDM in the downlink, where a receiving apparatus receives a sub-frame from a transmitting apparatus, wherein the sub-frame comprises a control channel region structured according to one of the different embodiments described herein. The control channel region in the sub-frame is divided into plural control channel elements for conveying physical downlink control channel information to the receiving apparatus. The receiving apparatus obtains the physical downlink control channel information for the receiving apparatus from the control channel elements comprised in the sub-frame.

Furthermore, in another embodiment of the invention the receiving apparatus is performing within the control channel region of the receiving apparatus, a blind detection of physical downlink control channel information comprised in one or more of the control channel elements.

The receiving apparatus may obtain a masked CRC code from a CRC field within the control channel element(s) conveying the physical downlink control channel information, de-mask the masked CRC code with a receiving apparatus-specific temporary identifier, and verifying successful blind detection of the control information for the receiving apparatus based on the CRC code.

Moreover, the receiving apparatus may also receiving from a transmitting apparatus a control channel assignment message for configures the physical resource block pairs for signaling the physical downlink control channel information to the receiving apparatus.

Other embodiments of the invention relate to the implementation of the principles of this invention in hardware and/or software. Accordingly, another embodiment of the invention is providing a transmitting apparatus for use in a 3GPP-based based communication system using OFDM in the downlink. The transmitting apparatus is capable of mapping control channel information for a receiving apparatus to control channel elements of a control channel region of a sub-frame. The transmitting apparatus comprises a processing unit for assigning to a receiving apparatus a control channel region within sub-frames for signaling physical downlink control channel information to the receiving apparatus. The assigned control channel region is thereby spanning one or more physical resource block pairs consisting each of a plurality of $N_{SC}$ subcarriers in the frequency domain and $N_{symb}^{R-PDCCH}$ OFDM symbols in the time domain. Furthermore, the control channel region is structured according to one of the different embodiments described herein. The transmitting apparatus also comprises a mapping unit for mapping the physical downlink control channel information for the receiving apparatus to the control channel elements defined in the control channel region.

The transmitting apparatus according to another embodiment of the invention comprises a transceiver unit for signaling to the receiving apparatus a control channel assignment message for assigning the physical resource block pairs for signaling the physical downlink control channel information to the receiving apparatus.

In a further embodiment of the invention, the transmitting apparatus's processing unit is adapted to generate a sub-frame comprising the physical downlink control channel information for the receiving apparatus in the control channel region, wherein the control channel region for the receiving apparatus is located in the shared data region of the sub-frame. Moreover, the transceiver unit of the transmitting apparatus is adapted to transmit the sub-frame to the receiving apparatus.

The transmitting apparatus according to another embodiment of the invention is comprising means adapted to perform the steps of the for mapping physical downlink control channel information for a receiving apparatus to control channel elements of a control channel region of a sub-frame of a 3GPP-based based communication system using OFDM in the downlink according to one of the various exemplary embodiments described herein.

Another embodiment of the invention is related to a receiving apparatus for receiving control information for a receiving apparatus of a 3GPP-based communication system using OFDM in the downlink. The receiving apparatus comprises a receiver unit for receiving a sub-frame from a transmitting apparatus, wherein the sub-frame comprises a control channel region structured according to one of the various embodiments described herein. The control channel region is further divided into plural control channel elements for conveying physical downlink control channel information to the receiving apparatus. The receiving apparatus further has a processing unit obtaining from the control channel elements comprised in the sub-frame the physical downlink control channel information for the receiving apparatus.

In another embodiment of the invention, the processing unit of the receiving apparatus is adapted to perform within the control channel region of the receiving apparatus, a blind detection of physical downlink control channel information comprised in one or more of the control channel elements.

The processing unit of the receiving apparatus is for example adapted to obtain a masked CRC code from a CRC field within the control channel element(s) conveying the coded physical downlink control channel information, to de-mask the masked CRC code with a receiving apparatus-specific temporary identifier, and to verify successful blind detection of the physical downlink control channel information for the receiving apparatus based on the CRC code.

Moreover, according to another embodiment, the receiving apparatus also comprises a receiver unit for receiving from a transmitting apparatus a control channel assignment message for configures the physical resource block pairs for signaling the physical downlink control channel information to the receiving apparatus.

Another embodiment of the invention is providing a computer-readable medium that is storing instructions that, when executed by a processing unit of a transmitting apparatus, cause the transmitting apparatus to perform the method for mapping physical downlink control channel information for a receiving apparatus to control channel elements of a control channel region of a sub-frame of a 3GPP-based based communication system using OFDM in the downlink according to one of the various embodiment of the invention described herein. The executed instructions may cause the transmitting apparatus to assign to a receiving apparatus a control channel region within sub-frames for signaling control information to the receiving apparatus. The assigned control channel region is spanning plural physical resource block pairs consisting each of a plurality of $N_{SC}$ subcarriers in the frequency domain and $N_{symb}^{R-PDCCH}$ OFDM symbols in the time domain. The control channel region has a structure according to one of the different embodiments of the invention described herein. Furthermore, the transmitting apparatus may be caused by the execution of the instructions to map the physical downlink control channel information for the receiving apparatus to the control channel elements defined in the control channel region.

Another embodiment of the invention is providing a computer-readable medium that is storing instructions that, when executed by a processing unit of a receiving apparatus, cause the transmitting apparatus to perform the method for mapping physical downlink control channel information for a receiving apparatus to control channel elements of a control channel region of a sub-frame of a 3GPP-based based communication system using OFDM in the downlink according to one of the various embodiment of the invention described herein.

BRIEF DESCRIPTION OF THE FIGURES

In the following the invention is described in more detail in reference to the attached figures and drawings. Similar or corresponding details in the figures are marked with the same reference numerals.

DETAILED DESCRIPTION OF THE INVENTION

The following paragraphs will describe various embodiments of the invention. For exemplary purposes only, most of the embodiments are outlined in relation to an orthogonal single-carrier uplink radio access scheme according to 3GPP LTE (Release 8) and LTE-A (Release 10) mobile communication systems discussed in the Technical Background section above. It should be noted that the invention may be advantageously used for example in connection with a mobile communication system such as 3GPP LTE (Release 8) and LTE-A (Release 10) communication systems previously described, but the invention is not limited to its use in this particular exemplary communication network.

The explanations given in the Technical Background section above are intended to better understand the mostly 3GPP LTE (Release 8) and LTE-A (Release 10) specific exemplary embodiments described herein and should not be understood as limiting the invention to the described specific implementations of processes and functions in the mobile communication network.

Figure 8:
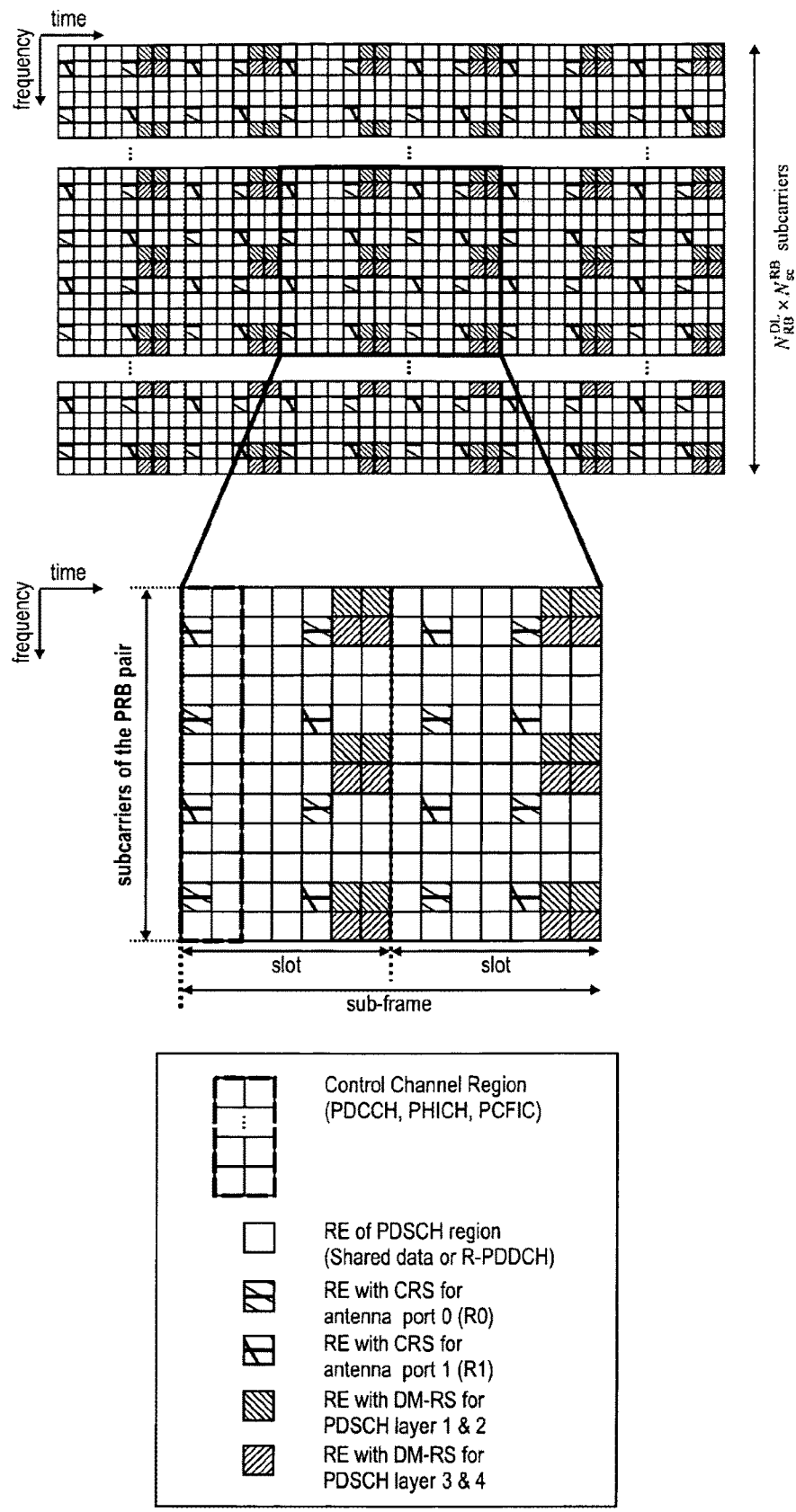
Figure 10:
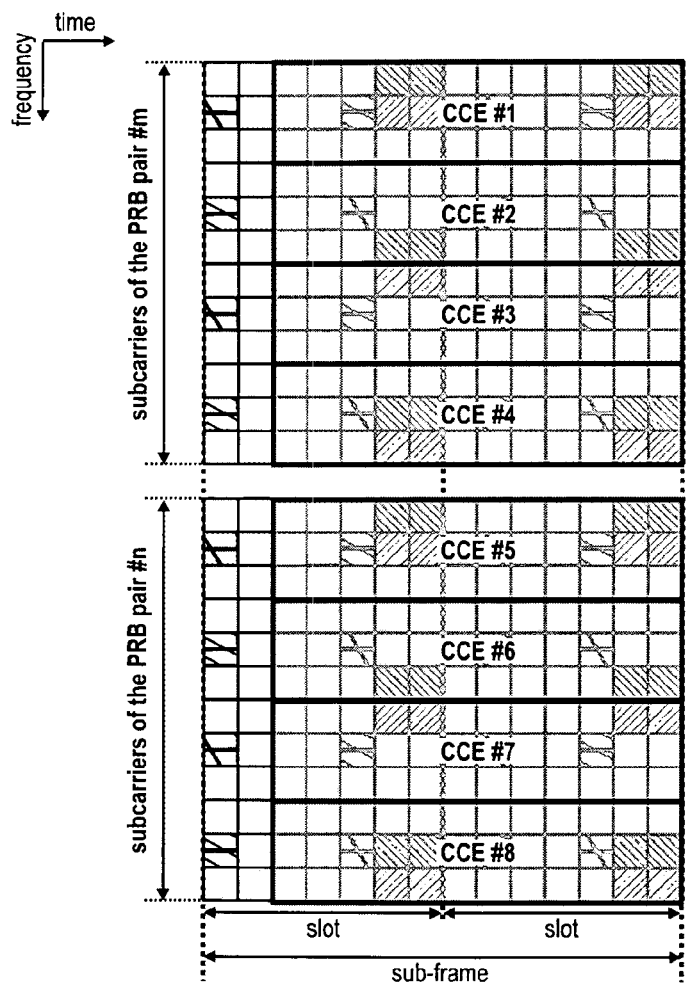

One solution for the mapping of the control information for a relay node to its control channel region within the shared data region of the backhaul downlink sub-frames is to divide each physical resource block pair into several control channel elements as exemplified in FIG. 10. FIG. 10 shows an exemplary division of two physical resource block pairs #m and #n that are considered to be part of a R-PDCCH region of a relay node into 8 control channel elements (CCEs). Please note that FIG. 10 further assumes that normal sub-frames, as exemplified in FIG. 8 are employed on the downlink between donor eNodeB and relay node within a 3GPP-LTE or LTE-A compatible communication network.

The R-PDCCH information is mapped to a limited number of physical resource block pairs. In the exemplary division of the physical resource block pair of FIG. 10, CCE level interleaving among of R-PDCCH information of different relay nodes that have overlapping or identical R-PDCCH regions can be used. Depending on whether the two physical resource block pairs are localized (e.g. n=m+1) or distributed (e.g. n=m+offset with offset>1) in frequency domain, localized or distributed mapping of R-PDCCH information for a relay node can be realized. The offset may be considered to correspond to a certain number of subcarriers, i.e. a given offset bandwidth. In one exemplary embodiment, the offset is chosen to be larger than or equal to the coherence bandwidth of the channel, such that the channel conditions within these two resource blocks are independent.

In the example of FIG. 10, it is assumed that 8 CCEs should be available in the two physical resource block pairs, so that in the frequency domain the $2 \cdot N_{SC}=24$ subcarriers of the two resource block pairs #m and #n are divided in blocks of $N_{SC}^{CCE}=24/8=3$ subcarriers into the CCEs. Due to the sub-frame structure of a normal sub-frame comprising cell-specific reference signals (e.g. CRS) and UE-specific reference signals (or for a relay node relay node-specific reference signals), (e.g. DM-RS) as shown in FIG. 8, the resulting CCE have different numbers of resource elements within each CCE being available for the signaling of the R-PDCCH information of a relay node. Table 1 shows an overview of the number of resource elements per CCE in the example shown in FIG. 10.

TABLE 1

| CCE number | Number of RE for R-PDCCH information | Number of RE for CRS | Number of RE for DM-RS |
|---|---|---|---|
| 1 | 22 | 3 | 8 |
| 2 | 26 | 3 | 4 |
| 3 | 26 | 3 | 4 |
| 4 | 22 | 3 | 8 |
| 5 | 22 | 3 | 8 |
| 6 | 26 | 3 | 4 |
| 7 | 26 | 3 | 4 |
| 8 | 22 | 3 | 8 |

As can be seen from Table 1 the amount of R-PDCCH information that can be conveyed in the respective CCEs is differing among the CCEs (each RE corresponds to one modulation symbol and thus to a corresponding number of coded bits depending on the modulation scheme level). This appears not desirable as this would either require the adaption of the modulation and coding rate to the number of REs available for R-PDCCH information so as to be able to convey an equal size of R-PDCCH information in each CCE (one can assume that the modulation scheme is fixed, while the code rate would need to be adapted). This however requires a more complicated receiver side processing (as the applied code rate depends on the number of resource elements used for the R-PDCCH in the given CCE(s)). Furthermore, this would also require a more complicated R-PDCCH information-to-CCE mapping at the transmitting apparatus, since the required code rate for achieving a certain block error rate (BLER) or better, depends on the CCE number. For example, in case a R-PDCCH information is mapped to CCE #2 (26 REs), a CCE aggregation level of 1 may be sufficient, while in case a R-PDCCH information is mapped on CCE #1 (22 REs), a CCE aggregation level of 2 may be required. Alternatively, different DCI formats of the R-PDCCH information may need to be defined so as to address the number of REs available for R-PDCCH information within the respective CCE(s) to which the R-PDCCH information is to be mapped. This latter option appears even more undesirable, since this would require a very complex interaction of the physical resource mapping functionality and coding functionality of the eNodeB.

Another solution and in accordance with a first aspect of the invention, a new organization of a control channel region for conveying control information, such as physical downlink control channel (PDCCH) information is suggested. A control channel region is defined/configured within sub-frames of a OFDM-based air interface of a mobile communications system, such as for example a 3GPP-based system like 3GPP LTE (Release 8) or LTE-A (Release 10). The control channel region is divided into control channel elements that have equal size irrespective of the presence of further cell-specific and/or UE-specific reference signals within the control channel region. This is achieved by dividing the control channel region in plural sub-control channel elements. The sub-channel elements are combined to control channel elements having equal size. According to the first aspect of the invention, the control channel region is divided in the frequency domain and/or time domain in a FDM respectively TDM fashion.

"Equal in size" means that the number of resource elements available for the signaling of control information within the control channel elements is the same for all control channel elements of the control channel region. It is a matter of definition whether the reference signals that are located within the control channel elements are counted as part of the control channel elements or not, and the invention is applicable to both options. In the following examples, the reference symbols are not part of the sub-control channel elements and control channel elements for exemplary purposes only.

The control channel region may span plural resource block pairs of the sub-frame, but may not necessarily "cover" the entire time domain resources of the sub-frame. Depending on the number of control channel elements in the control channel region required for transmitting the control information to be signaled on the physical resources of the control channel region and its mapping mode (localized or distributed), sub-control channel elements of the same or different resource block pairs are combined to form the control channel elements. Furthermore, a distributed mapping of the control information may also be realized by mapping the control information to control channel elements of different resource block pairs, while each of the control channel elements themselves are formed by sub-control channel elements of one resource block pair only.

As will become apparent from the following in more detail, the principles of this invention may be used for the signaling of physical control channel information from a base station (donor eNodeB) to relay nodes, from a base station (eNodeB) to mobile terminals (user equipments) and from a relay node to mobile terminals (user equipments). Accordingly, it will be referred to transmitting the control information from a "transmitting apparatus" (i.e. base station or relay node) to a "receiving apparatus" (i.e. relay node or mobile terminal) herein.

FIG. 26 to FIG. 29 show different exemplary configuration of a control channel region within a sub-frame according to different embodiments of the invention. Please note that in all four examples, the sub-frame contains reference signals in some of the resource elements of the sub-frame. The reference signals may be provided in a regular pattern. Furthermore, the reference signals may be for example common reference signals (pertaining to all terminals/relay nodes of a radio cell), and/or terminal-specific reference signals, such as for example DM-RS for respective user equipments/relay nodes. Please note that although the FIG. 26 to FIG. 29 exemplarily indicate the physical resource block pairs forming the control channel region to be adjacent to each other, this is not mandatory, but the individual resource block pairs may also be distributed in the frequency domain of the system bandwidth. Furthermore, it is also possible that there are adjacent and non-adjacent physical resource block pairs configured as the control channel region.

Figure 26:
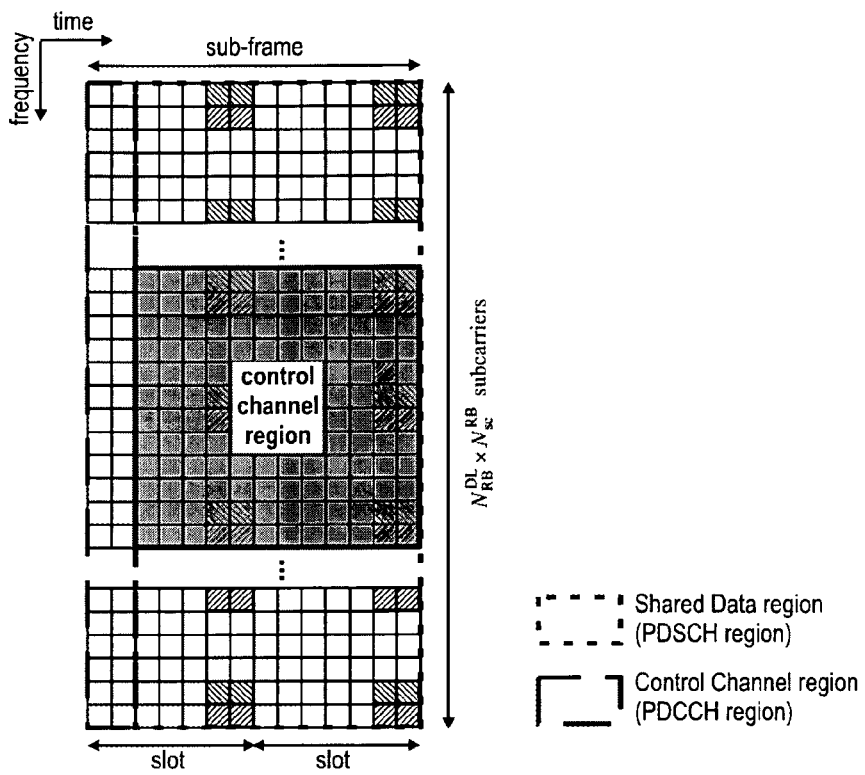
FIGS. 26 to 29 show different exemplary configuration of a control channel region within a sub-frame according to different embodiments of the invention.

FIG. 26 shows an example where the control region is configured within the shared data region (PDSCH region) of the sub-frame. This example may be especially applicable (but not restricted to) for the transmission of PDCCH information to relay nodes. The control channel region shown in FIG. 26 spans the entire $N_{symb}^{PDSCH}$ OFDM symbols of the PDSCH region, i.e. $N_{symb}^{R-PDCCH} = N_{symb}^{PDSCH} = 2 \cdot N_{symb} - N_{symb}^{PDCCH}$ in this example, where $N_{symb}^{R-PDCCH}$ is the number of OFDM symbols of the control region in the time domain, $N_{symb}^{PDSCH}$ is the number of OFDM symbols of the shared data region in the time domain, $N_{symb}^{PDCCH}$ is the number of OFDM symbols of the control channel region (PDCCH region) in the time domain, and $N_{symb}$ is the number of ODFM symbols of a respective one of the two slots of the sub-frame in the time domain.

Generally, $N_{symb}^{PDCCH}$ may be for example dynamically configured, e.g. may correspond to the PCFICH value that is signaled within a sub-frame. Alternatively, $N_{symb}^{PDCCH}$ may be configured on a semi-static or static basis as well.

Figure 27:
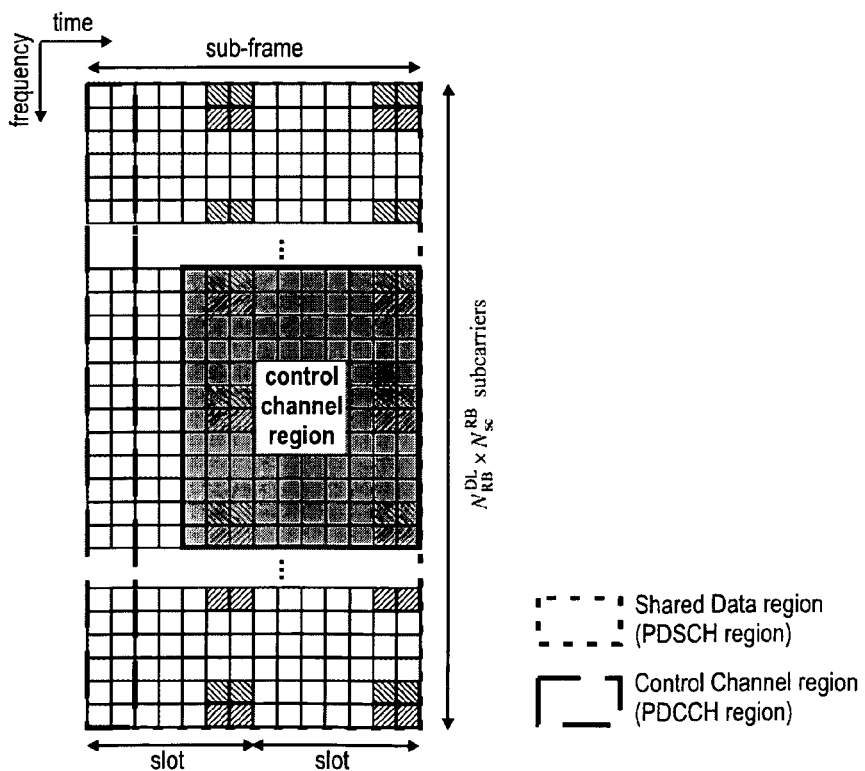

FIG. 27 shows another example where the control region is configured within the shared data region (PDSCH region) of the sub-frame. In the example shown in FIG. 27, the control channel region is not spanning the entire PDSCH region, but the control channel spans the OFDM symbols of the sub-frame starting at symbol index $n_{start}^{R-PDCCH}$. In the example of FIG. 27, the $N_{symb}^{R-PDCCH}$ symbols of the control region are the $5^{th}$ to the last ($14^{th}$) OFDM symbol of the sub-frame ($n_{start}^{R-PDCCH}=5$). $n_{start}^{R-PDCCH}$ may be for example configured on a semi-static basis using RRC signaling or is broadcast in the cell by means of system information. Alternatively, $n_{start}^{R-PDCCH}$ could be static/predefined.

Please note that in a variation of this example, not only the start index $n_{start}^{R-PDCCH}$ of the control region may be configured but also the end index $n_{end}^{R-PDCCH}$, so that in the time domain the control channel region spans the OFDM symbols $n_{start}^{R-PDCCH}$ to $n_{end}^{R-PDCCH}$ ($n_{start}^{R-PDCCH} < n_{end}^{R-PDCCH}$). Both indices may be semi-statically or statically configured as described above.

Figure 28:
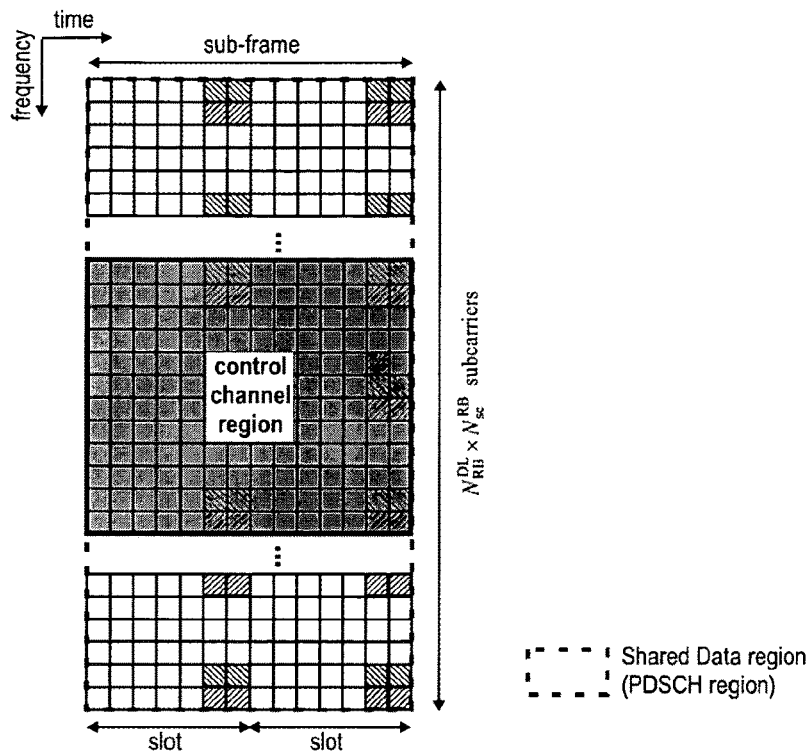

The exemplary control channel configurations shown in FIG. 26 and FIG. 27 may be useful for conveying physical downlink control channel information (e.g. uplink and downlink grants) to from a base station (donor eNodeB) to a relay node. However, as outlined above, the invention is not limited to this scenario. FIG. 28 shows another exemplary configuration of a control channel region within a sub-frame according to another embodiment of the invention. In this example, the sub-frame has no control channel region configured, so that all OFDM symbols of the sub-frame may be considered part of the PDSCH region. In this case the transmitting apparatus (donor eNodeB or relay node) may configure control channel regions for the served receiving apparatus(es) (relay nodes or user equipments) that span the entire sub-frame in the time domain (e.g. all $2 \cdot N_{symb}$ OFDM symbols of the sub-frame).

Figure 29:
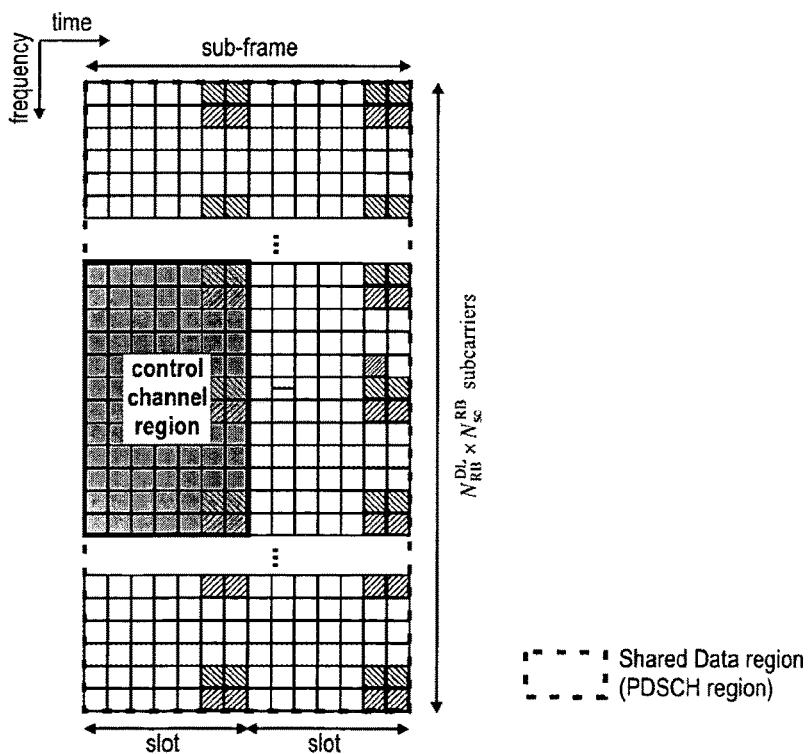

Alternatively, as shown in FIG. 29, the control channel region may also be configured to span only a certain range within the sub-frame, for example the first or second slot thereof. Hence, the individual extend of the control channel region may also be limited by the slot boundaries within the sub-frame.

Also the control channel region configurations in FIG. 28 and FIG. 29 may be configured on a dynamic, semi-static or static basis as outlined above. For example, for a semi-static configuration the starting index $n_{start}^{R-PDCCH}$ and optionally the end index $n_{end}^{R-PDCCH}$ may be configured.

In the following, control channel structures according to several exemplary embodiments of the invention will be outlined. The embodiments are given with respect to a 3GPP-based mobile communications network using OFDMA in the downlink. Furthermore, the control channel region is referred to as R-PDCCH region in most of the examples below, as it is exemplarily assumed that the control channel structures discussed in the following is used for providing PDCCH information for a relay node from a donor eNodeB to a relay node.

Figure 9:
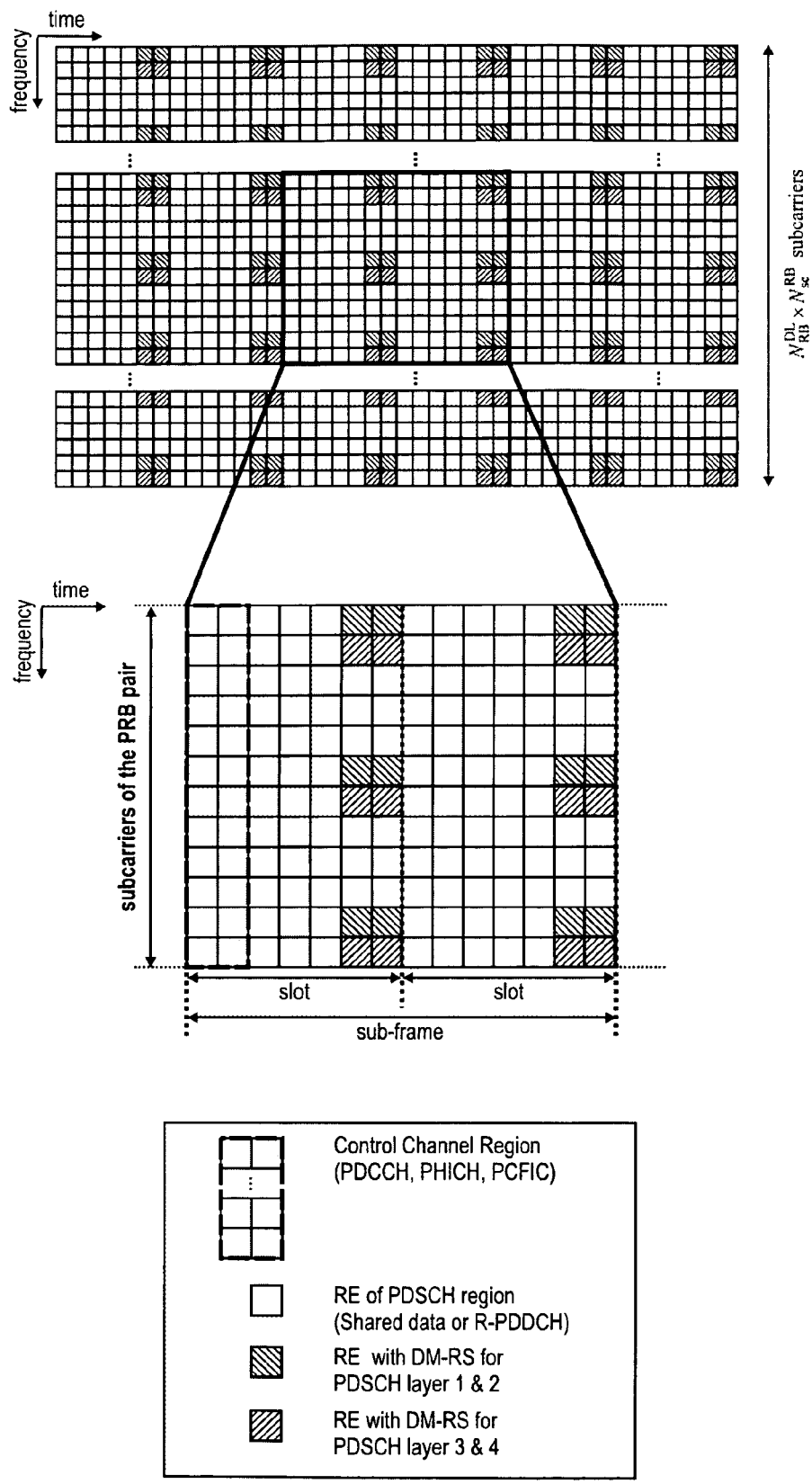

Moreover, the examples are based on the sub-frame structure of a 3GPP LTE (Release 8) system as shown in FIG. 8 and FIG. 9. When applying this invention to 3GPP LTE-A (Release 10), it can be assumed that the sub-frame structure of 3GPP LTE (Release 8) is reused on the aggregated component carriers. In this case the sub-frame will span the aggregated component carriers of a user equipment, respectively relay node, i.e. the total number $N_{RB}^{DL}$ of downlink resource blocks available within the sub-frame accounts for the total bandwidth of the aggregated component carriers. Though the sub-frame may span the entire bandwidth o the aggregated component carriers, the control channel region may still be defined per-component carrier. Also resource allocation by means of physical downlink control channel information may be performed for the individual component carriers rather than one aggregated component carrier. The use of sub-frame structures of a 3GPP LTE (Release 8) system is only exemplary and not limiting the invention to these structures.

Figure 11:
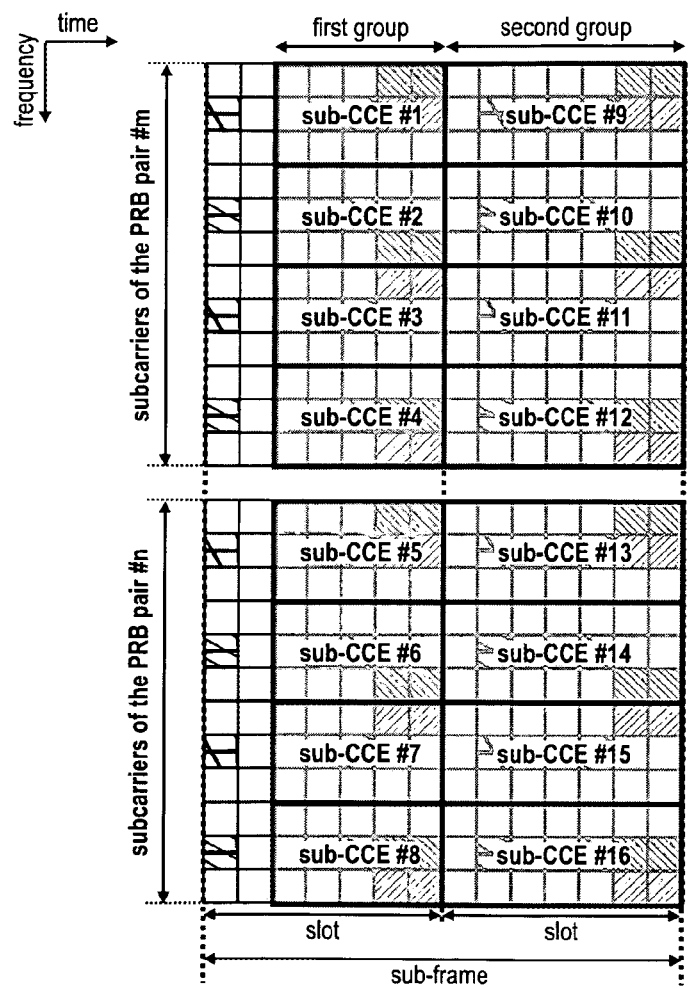

FIG. 11 exemplifies a division of two physical resource block pairs #m and #n of a R-PDCCH region of a normal sub-frame into 16 sub-control channel elements (sub-CCEs) according to an exemplary embodiment of the invention. In FIG. 11, the approach depicted in FIG. 26 is adopted, i.e. the control channel region is spanning the PDSCH region of the sub-frame. Furthermore, the sub-frame is assumed to have a PDCCH region that is spanning the first two OFDM symbols—please note that the PDCCH region of the sub-frame may have $N_{symb}^{PDCCH} \in [0, \ldots, 4]$ OFDM symbols in the time domain.

The R-PDCCH channel region is spanning $N_{RB}^{R-PDCCH}$ resource blocks in the frequency domain and $N_{symb}^{R-PDCCH}$ OFDM symbols in the time domain. Please note that the control channel region may span multiple resource blocks (even and odd numbers) in the frequency domain. FIG. 11 exemplarily depicts the organization of sub-control channel elements for two physical resource block pairs. If there are more than two resource block pairs configured from the R-PDCCH region, the other resource block pairs are divided into sub-control channel elements in a similar fashion as shown in FIG. 11.

The R-PDCCH region of the exemplary embodiment of FIG. 11 is divided in the time domain into two groups of OFDM symbols (first group and second group). In the frequency domain, the $N_{SC}=12$ subcarriers per resource block is divided into blocks of $N_{SC}^{CCE}=3$ subcarriers so that there are $N_{SC}/N_{SC}^{CCE}=4$ subcarriers comprised in each sub-control channel element. Although also other values may be chosen for $N_{SC}^{CCE}$ as long as $N_{SC} \bmod N_{SC}^{CCE}=0$, the value $N_{SC}^{CCE}$=3 together with the division of the R-PDCCH region in the time domain appears of particular advantage in connection with the assumed sub-frame structure of FIG. 8 and FIG. 9, as the proposed division of the R-PDCCH region into sub-control channel elements (sub-CCE #i) allows for having either two resource elements or four resource elements per sub-control channel element, which allows a simple combination of pairs of sub-control channel elements to control channel elements of equal size.

Furthermore, it should be noted in FIG. 11 that the boundary of the sub-control channel elements is defined by the slot boundaries of the sub-frame. Hence the first group of sub-control channel elements is spanning the $N_{symb}-N_{symb}^{PDCCH}$=5 OFDM symbols, while the control channel elements of the second group is spanning the remaining $N_{symb}$=7 OFDM symbols, i.e. the second slot of the sub-frame in the time domain.

The sub-control channel elements in the first group have either $k_1$=10 or $k_2$=12 resource elements for conveying the control information, i.e. which are not used for reference signals. The sub-control channel elements in the second group have either $l_1$=15 or $l_2$=17 resource elements for conveying the control information. Thus, the sub-control channel elements #1 to #8 can be combined respectively with one of sub-control channel elements #9 to #16 to form control channel elements of size $j=k_1+l_2=k_2+l_1$=27 (i.e. 27 resource elements are available to convey the PDCCH information for the receiving apparatus).

Figure 1:
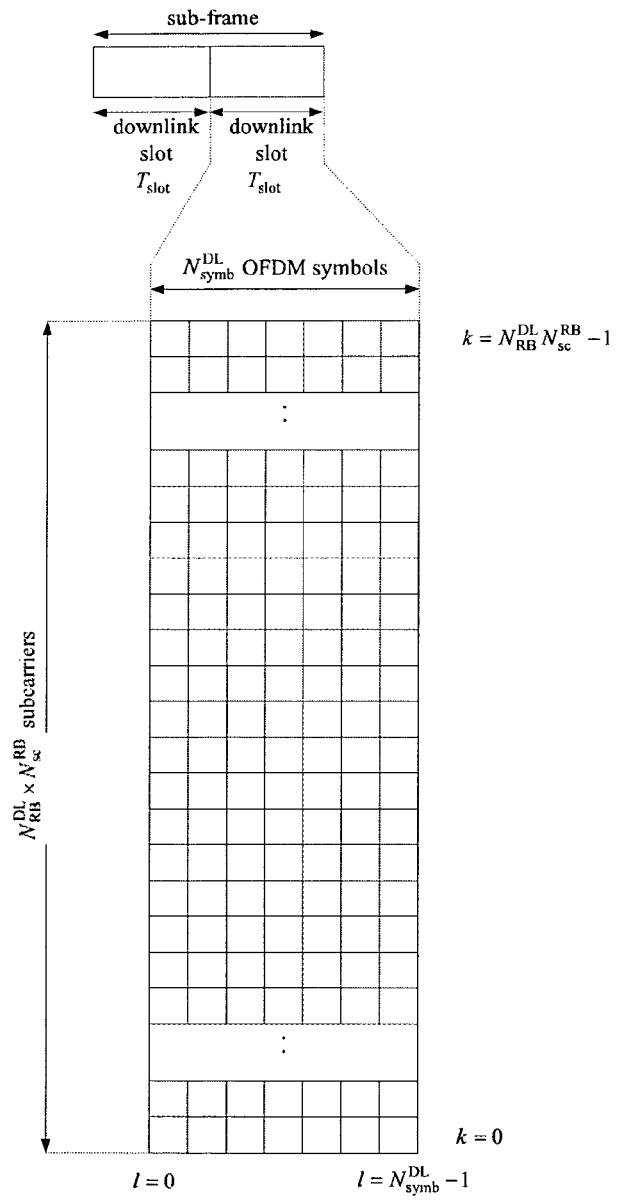
FIG. 1 shows the general structure of a sub-frame on a downlink component carrier as defined for 3GPP LTE (Release 8)
Figure 2:
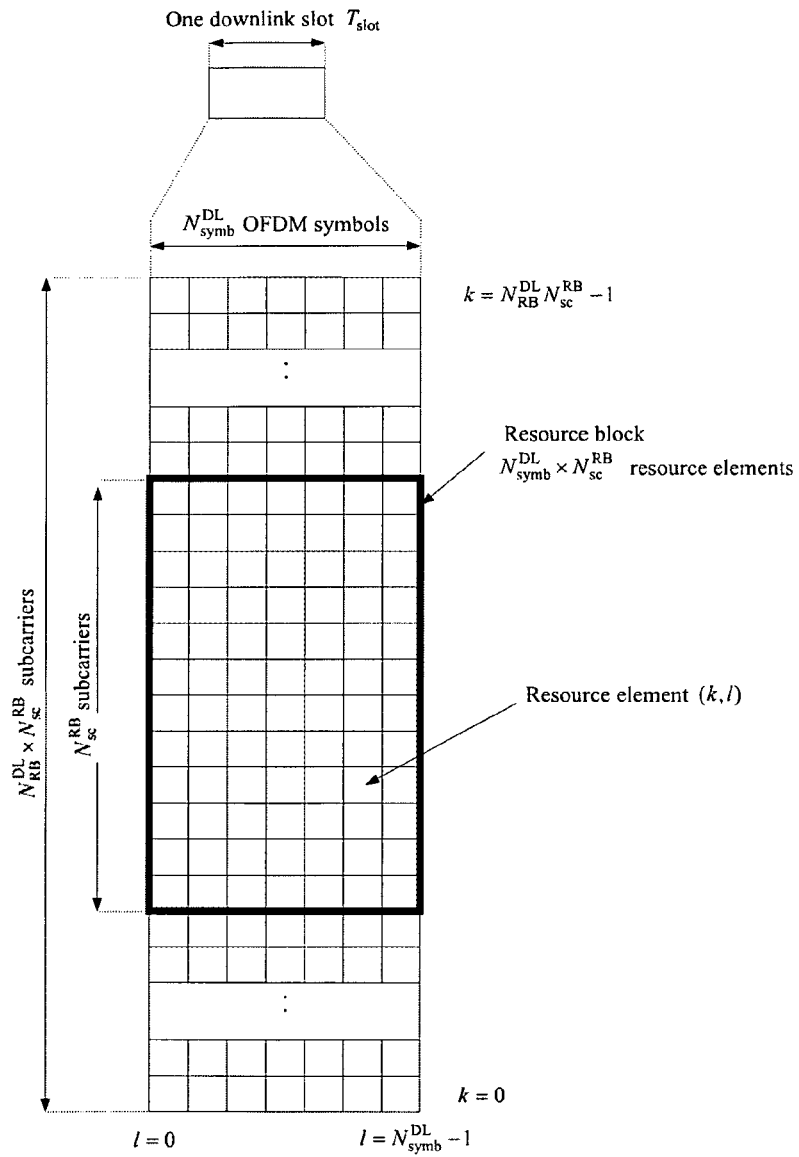
FIG. 2 shows an exemplary downlink resource grid of one of the two downlink slots of a sub-frame as defined for 3GPP LTE (Release 8)
Figure 3:
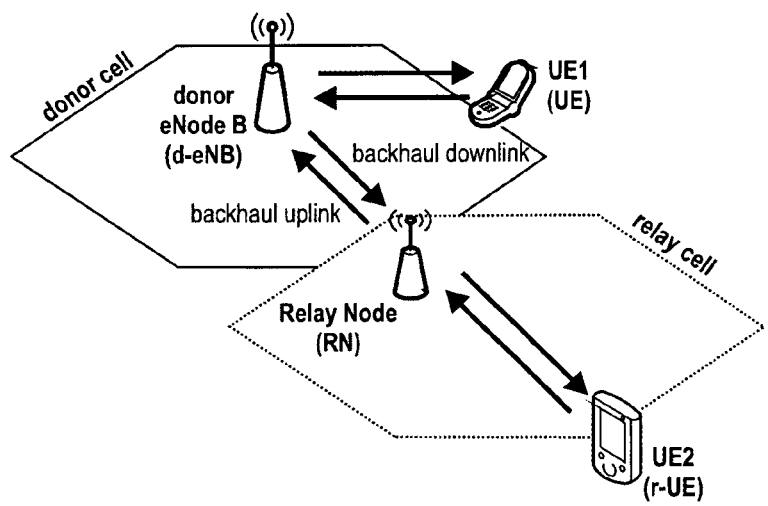
FIG. 3 shows an exemplary network configuration of a donor eNodeB (d-eNB), a relay node (RN) and two user equipments (UE1 and UE2)
Figure 4:
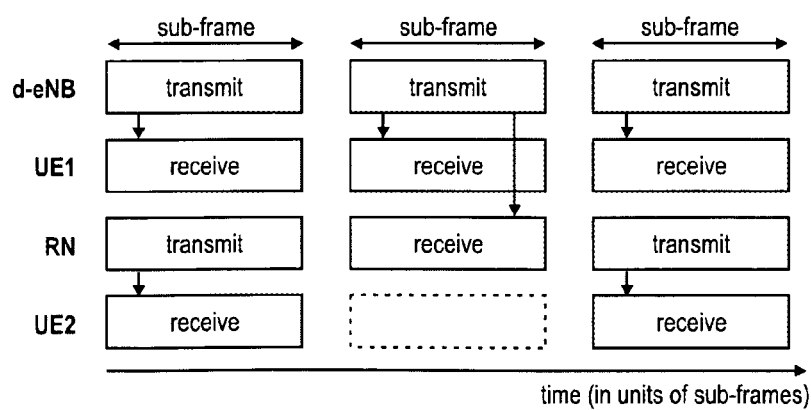
FIG. 4 shows an exemplary behavior of the entities in FIG. 3 with respect to their operation in transmission mode and reception mode.
Figure 5:
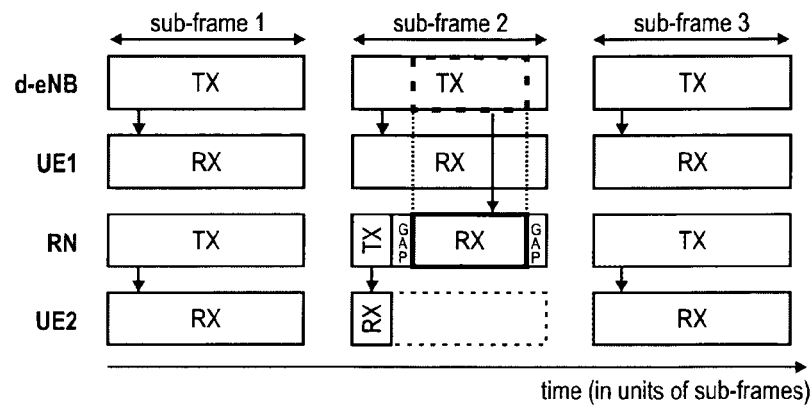
FIG. 5 shows an exemplary backward-compatible behavior of the entities in FIG. 3 with respect to their operation in transmission mode and reception mode in an enhanced communication system, such as 3GPP LTE-A (Release 10)
Figure 6:
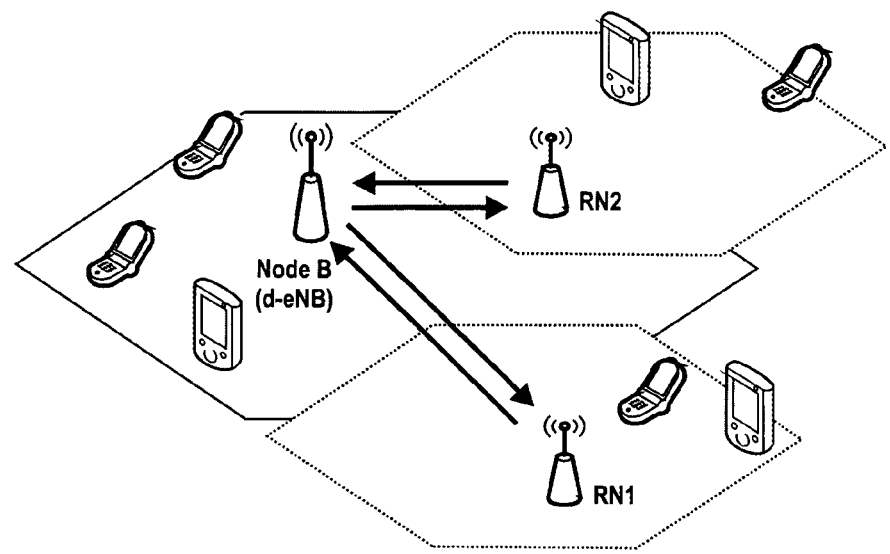
FIG. 6 shows another exemplary network configuration of a donor eNodeB (d-eNB), multiple relay nodes (RN1 and RN2) and multiple user equipments, FIG. 7 exemplarily illustrates the reception of a sub-frame from a donor eNodeB at different relay nodes and the transmission windows and reception windows of the relay nodes, taking into account the variable propagation delay of transmission signals between the donor eNodeB (d-eNB) and relay nodes (RN1 and RN2) and a switching between transmission mode and reception mode within the sub-frame at the relay nodes, FIGS. 8 & 9 exemplify the structure of a normal sub-frames, respectively a MBSFN sub-frames and a physical resource block pair thereof as defined for 3GPP LTE (Release 8) and 3GPP LTE-A (Release 10) and as used in some of the embodiments of the invention, FIG. 10 exemplifies a division of two physical resource block pairs #m and #n of a R-PDCCH region into eight control channel elements (CCEs), FIG. 11 exemplifies a division of two physical resource block pairs #m and #n of a R-PDCCH region of a normal sub-frame into sixteen sub-control channel elements (sub-CCEs) according to an exemplary embodiment of the invention.
Figure 7:
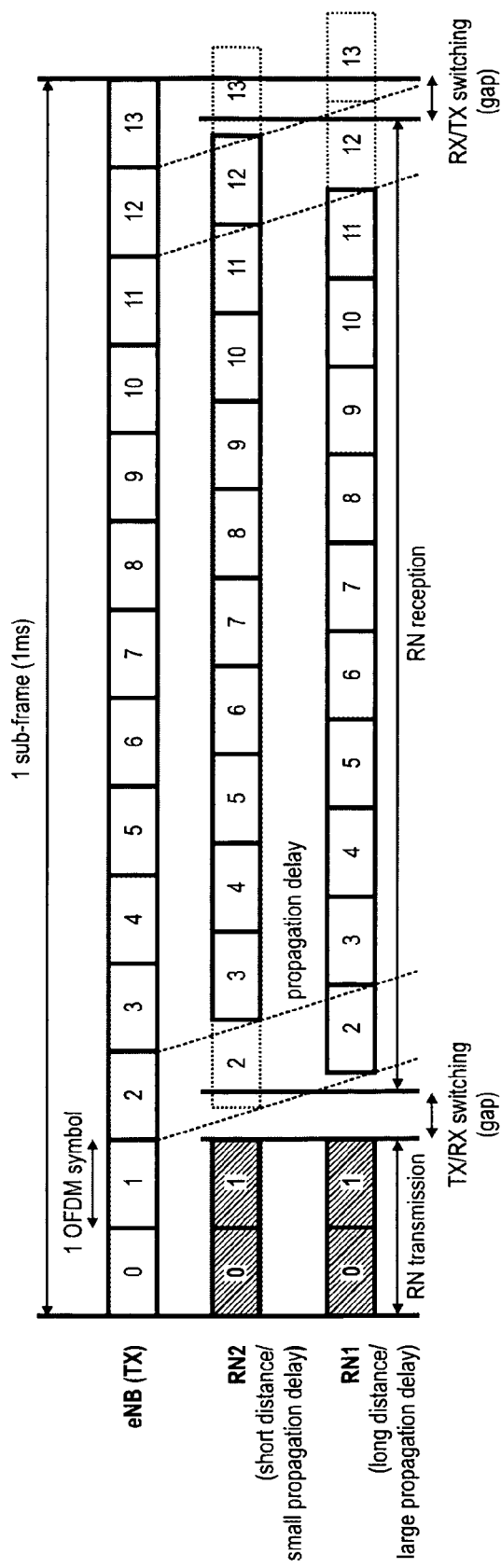
Figure 12:
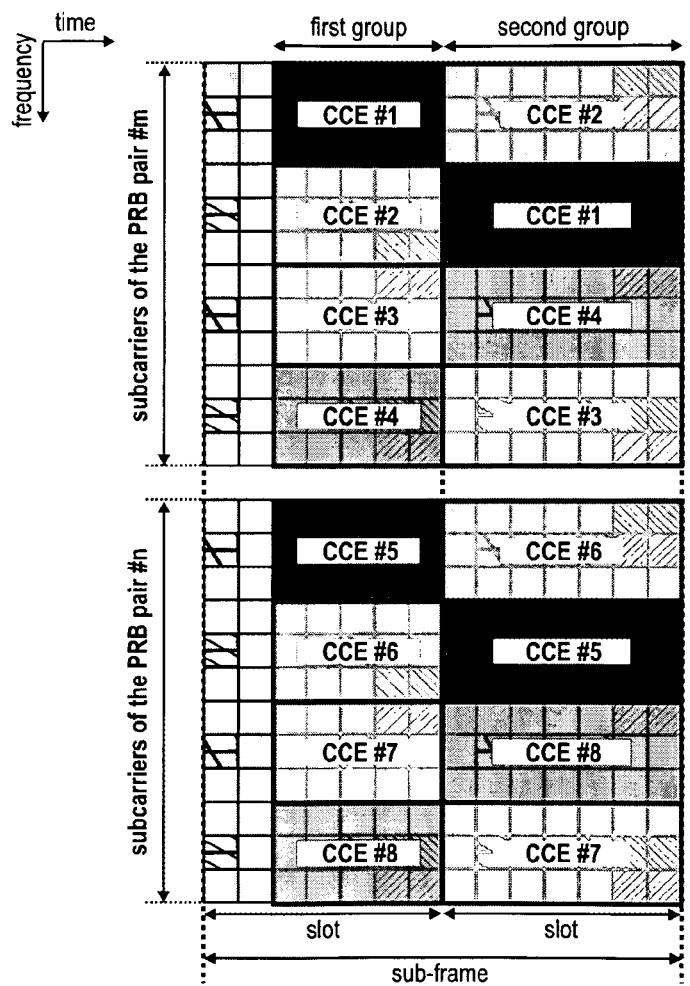
FIGS. 12 & 13 show exemplary combinations of pairs of sub-control channel elements (sub-CCEs) of FIG. 11 to form eight control channel elements (CCEs) that allow for a localized, respectively distributed mapping of the R-PDCCH information according to an embodiment of the invention.
Figure 13:
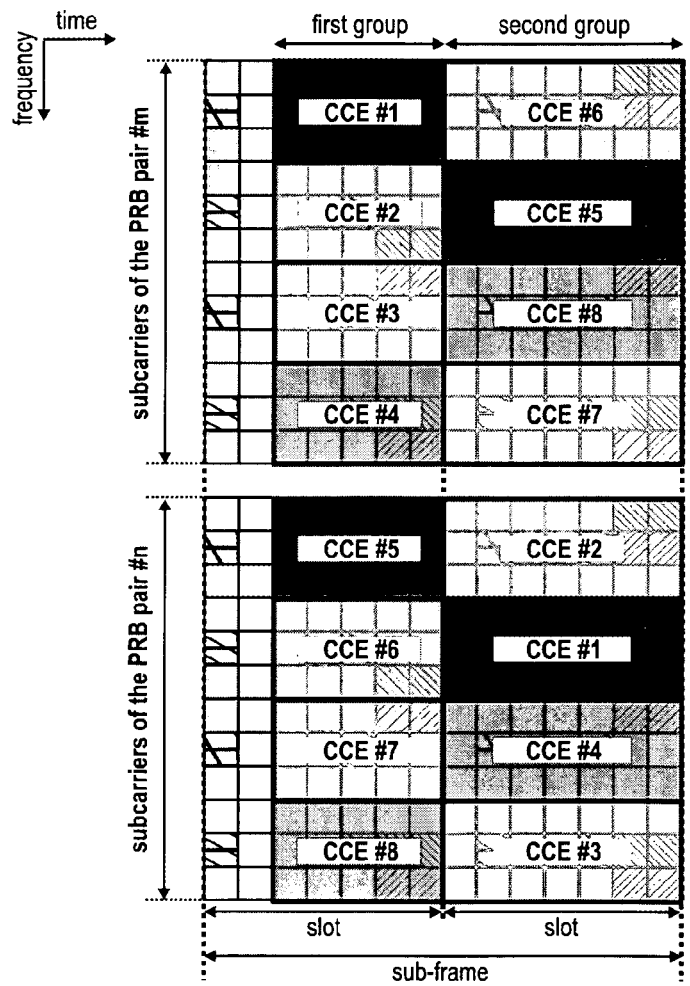

FIG. 12 and FIG. 13 show exemplary combinations of pairs of the 16 sub-control channel elements (sub-CCEs) of FIG. 11 to form 8 control channel elements (CCEs) using a localized, respectively distributed mapping of the R-PDCCH information according to an embodiment of the invention. FIG. 2 and Table 2 show the combination of sub-control channel elements to obtain a localized mapping of control channel elements.

TABLE 2

| Control Channel Element | Sub-control channel element of first group | Sub-control channel element of second group | Resource block pairs utilized |
| --- | --- | --- | --- |
| CCE #1 | Sub-CCE #1 | Sub-CCE #10 | PRB pair #m |
| CCE #2 | Sub-CCE #2 | Sub-CCE #9 | PRB pair #m |
| CCE #3 | Sub-CCE #3 | Sub-CCE #12 | PRB pair #m |
| CCE #4 | Sub-CCE #4 | Sub-CCE #11 | PRB pair #m |
| CCE #5 | Sub-CCE #5 | Sub-CCE #14 | PRB pair #n |
| CCE #6 | Sub-CCE #6 | Sub-CCE #13 | PRB pair #n |
| CCE #7 | Sub-CCE #7 | Sub-CCE #16 | PRB pair #n |
| CCE #8 | Sub-CCE #8 | Sub-CCE #15 | PRB pair #n |

As can be seen from Table 2 and FIG. 12, all control channel elements are defined within one of the physical resource block pairs of the R-PDCCH region. Accordingly, also in case of using more then two physical resource block pairs such control channel elements of equal size can be built within a respective physical resource block pair.

Table 3 below shows an alternative combination of sub-control channel elements shown in FIG. 11 to form control channel elements that allow for a localized mapping of the PDCCH information.

TABLE 3

| Control Channel Element | Sub-control channel element of first group | Sub-control channel element of second group | Resource block pairs utilized |
| --- | --- | --- | --- |
| CCE #1 | Sub-CCE #1 | Sub-CCE #11 | PRB pair #m |
| CCE #2 | Sub-CCE #2 | Sub-CCE #9 | PRB pair #m |

TABLE 3-continued

| Control Channel Element | Sub-control channel element of first group | Sub-control channel element of second group | Resource block pairs utilized |
| --- | --- | --- | --- |
| CCE #3 | Sub-CCE #3 | Sub-CCE #12 | PRB pair #m |
| CCE #4 | Sub-CCE #4 | Sub-CCE #10 | PRB pair #m |
| CCE #5 | Sub-CCE #5 | Sub-CCE #15 | PRB pair #n |
| CCE #6 | Sub-CCE #6 | Sub-CCE #13 | PRB pair #n |
| CCE #7 | Sub-CCE #7 | Sub-CCE #16 | PRB pair #n |
| CCE #8 | Sub-CCE #8 | Sub-CCE #14 | PRB pair #n |

It may be assumed that the PDCCH information is either mapped to 1, 2, 4 or 8 control channel elements (i.e. the CCE aggregation size is $2^i$). Hence, when mapping the PDCCH information of a receiving apparatus to $2^i \leq 4$ of the control channel elements, it may be ensured that the PDCCH information are all transmitted within one of the physical resource block pairs, i.e. in a localized fashion. If the CCE aggregation level is higher than 4, i.e. all $2^3$=8 control channel elements are used to carry the PDCCH information of a receiving apparatus, adjacent physical resource block pairs (i.e. n=m±1) may be used so that the PDCCH information is getting mapped to a localized set of subcarriers in the frequency domain. Alternatively, the also non-adjacent physical resource block pairs may form the R-PDCCH region, i.e. n≠m±1.

The terms "adjacent" and "nom-adjacent" may not necessarily refer to neighboring or not neighboring physical resource block pairs. Rather, a localized mapping may be understood as to refer to a mapping of the PDCCH information to resource block pairs that are within the coherence bandwidth of the channel (such that the channel conditions channel conditions within the two resource blocks are dependent from each other), while a distributed mapping of the PDCCH information may be understood as to refer to a mapping of the PDCCH information to resource block pairs that are larger than or equal to the coherence bandwidth of the channel (such that the channel conditions channel conditions within the two resource blocks are independent from each other).

FIG. 13 and Table 4 show the combination of sub-control channel elements to obtain a distributed mapping of control channel elements.

TABLE 4

| Control Channel Element | Sub-control channel element of first group | Sub-control channel element of second group | Resource block pairs utilized |
| --- | --- | --- | --- |
| CCE #1 | Sub-CCE #1 | Sub-CCE #14 | PRB pairs #m & #n |
| CCE #2 | Sub-CCE #2 | Sub-CCE #13 | PRB pairs #m & #n |
| CCE #3 | Sub-CCE #3 | Sub-CCE #16 | PRB pairs #m & #n |
| CCE #4 | Sub-CCE #4 | Sub-CCE #15 | PRB pairs #m & #n |
| CCE #5 | Sub-CCE #5 | Sub-CCE #10 | PRB pairs #m & #n |
| CCE #6 | Sub-CCE #6 | Sub-CCE #9 | PRB pairs #m & #n |
| CCE #7 | Sub-CCE #7 | Sub-CCE #12 | PRB pairs #m & #n |
| CCE #8 | Sub-CCE #8 | Sub-CCE #11 | PRB pairs #m & #n |

As can be seen from FIG. 13 and Table 4 the control channel elements in a distributed mapping comprise respective pairs of sub-control channel elements from the first group and sub-control channel elements of the second group located in different physical resource block pairs. This way the control channel elements are always "distributed" across the physical resource block pairs.

It should be further noted that within each physical resource block pair #m and #n, CRS and/or DM-RS is provided in the some predefined resource elements that are used by the receiving apparatus for channel estimation. CRS may for example be used when no beamforming is applied for the PDCCH information signaled in the R-PDCCH region. DM-RS may be used in a sub-frame for transmitting the beamforming is applied to the transmission of the PDCCH information in the R-PDCCH region on the air interface.

The number of DM-RS signals provided in the physical resource block pairs, respectively the control channel elements may imply an upper limit on the number of receiving apparatus(es) to which the control channel elements within a R-PDCCH region can be assigned (assuming that the R-PDCCH regions of multiple transmitting apparatuses is overlapping or identical). The DM-RS layers are receiving apparatus specific and may be required for demodulation of the data signaled within the assigned physical resources on the downlink. Therefore, each receiving apparatus that is to receive data within a given physical resource block pair of the R-PDCCH region may require a own DM-RS to be present in the control channel element(s) assigned to which the PDCCH information is transmitted.

If there are four antenna ports for DM-RS transmission configured at the transmitting apparatus, four DM-RS layers are available. The DM-RS signals from the four layers are orthogonal to each other. If one physical resource block pair is divided into four control channel elements as shown for example in FIG. 12 or FIG. 13, each control channel element can be linked to one DM-RS layer for demodulation. Accordingly, the control channel elements in each physical resource block pair of the R-PDCCH region can be assigned up to four receiving apparatus(es).

If only two antenna ports are available for DM-RS transmission, there can only be two DM-RS layers. In this case, one possibility is that each physical resource block pair is divided into two control channel element (see for example FIG. 21 and FIG. 22) and each control channel element is linked to one DM-RS layer. Hence, the control channel elements in each physical resource block pair of the R-PDCCH region can be assigned to one or two receiving apparatus(es) only.

Another possibility is that each physical resource block pair is still divided into four control channel elements, but two control channel elements are linked to one DM-RS layer, respectively receiving apparatus. Accordingly, in this example the CCE aggregation level size may be restricted to be at least two control channel elements per receiving apparatus and physical resource block pair.

For one control channel element (i.e. a combination of sub-control channel elements), the DM-RS layer may be chosen such that the number of DM-RS signals that are signaled in each control channel element is maximized. In the example shown in FIG. 12 and FIG. 13, all control channel elements comprise resource elements with DM-RS signals of all four layers.

Control channel elements #1, #2, #5 and #6 comprise four resource elements carrying DM-RS signals of layer 1 and 2 and two resource elements carrying DM-RS signals for layer 3 and 4. Accordingly, these control channel elements may be linked to DM-RS layer 1 or 2. Control channel elements #3, #4, #7 and #8 comprise two resource elements carrying DM-RS signals of layer 1 and 2 and four resource elements carrying DM-RS signals for layer 3 and 4, so that it is advantageous to link same to DM-RS layer 3 and 4. Accordingly, in a further embodiment of the invention, the transmitting apparatus ensures that the PDCCH information of a receiving apparatus is mapped to control channel element(s) linked to the DM-RS layer associated to the receiving apparatus, so that the number of DM-RS signals of the given DM-RS layer per control channel element can be maximized.

Furthermore, mapping of the PDCCH information to the control channel elements in the R-PDCCH region depends on the number of control channel elements available therein and the CCE aggregation size. It may be exemplarily assumed that the PDCCH information for a receiving apparatus is either mapped to 1, 2, 4 or 8 control channel elements.

For CCE aggregation level 1, i.e. the PDCCH information of a receiving apparatus is mapped to one control channel element of the R-PDCCH region, and assuming a localized mapping of the PDCCH information to the control channel element (i.e. a localized search space for the receiving apparatus), the two sub-CCEs that form a control channel element are chosen from the same physical resource block pair. In the distributed mapping of the PDCCH information to the control channel element (i.e. a distributed search space for the receiving apparatus), the two sub-CCEs that form a control channel element are chosen from different physical resource block pairs.

For CCE aggregation level 2, i.e. the PDCCH information of a receiving apparatus is mapped to two control channel elements of the R-PDCCH region, and assuming a localized mapping of the PDCCH information to the two control channel elements (i.e. a localized search space for the receiving apparatus), both control channel elements are located in the same physical resource block pair.

In the distributed mapping of the PDCCH information to the two control channel elements (i.e. a distributed search space for the receiving apparatus), both control channel elements are located in different physical resource block pairs. Furthermore, the control channel elements may be consistently distributed in frequency domain. For example, in FIG. 12 a distributed mapping of PDCCH information to the two control channel elements by the transmitting apparatus can be obtained by mapping the PDCCH information—for example—to CCE #1 and CCE #5. In addition, the control channel elements may be formed so that each control channel element is formed by sub-CCEs of multiple physical resource block pairs. In FIG. 13, each control channel element has a sub-CCE of physical resource block pair #m and a sub-CCE of physical resource block pair #n, so that a distributed mapping is obtained (irrespective of the actual CCE aggregation size).

Figure 18:
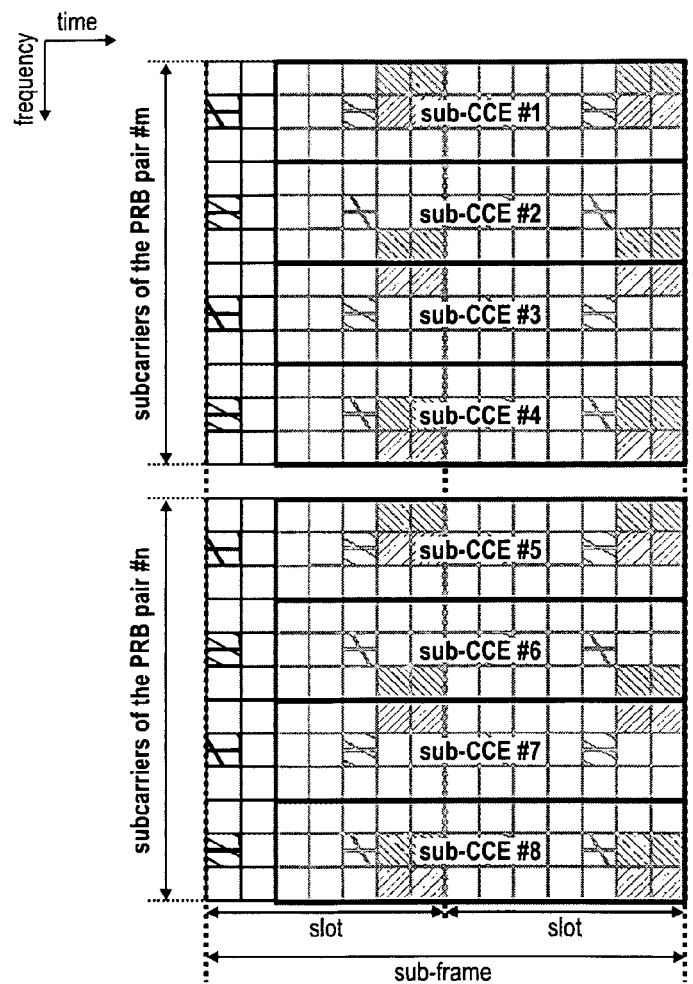

For CCE aggregation level 4, i.e. the PDCCH information of a receiving apparatus is mapped to four control channel elements of the R-PDCCH region, if one physical resource block pair is divided into two control channel elements—see for example the discussion of FIG. 18 to FIG. 20 below—, the two physical resource block pairs will be used for one signaling the PDCCH information. In this example, a localized or distributed mapping of the PDCCH information may be achieved by configuring the two physical resource block pairs either as adjacent physical resource block pairs or non-adjacent physical resource block pairs (as mentioned before, "adjacent" and "non-adjacent" may be defined relative to the coherence bandwidth of the channel).

If one physical resource block pair is divided into four control channel elements, a localized and distributed mapping of the PDCCH information to the four control channel elements may be obtained in a similar fashion as described fro CCE aggregation level 2.

For CCE aggregation level 8, i.e. the PDCCH information of a receiving apparatus is mapped to eight control channel elements of the R-PDCCH region, if one physical resource block pair is divided into two control channel elements, two physical resource block pairs will not be enough for transmitting the PDCCH information to the receiving apparatus. Hence, the transmitting apparatus may map only one half of the PDCCH information to the two physical resource block pairs. Another possibility is to configure four physical resource block pairs as the basic R-PDCCH region size.

Furthermore, if one physical resource block pair is divided into four control channel elements, the two physical resource block pairs within the R-PDCCH region are sufficient to carry the PDCCH information. In this case, a localized or distributed mapping of the PDCCH information may be achieved by configuring the two physical resource block pairs either as adjacent physical resource block pairs or non-adjacent physical resource block pairs (as mentioned before, "adjacent" and "non-adjacent" may be defined relative to the coherence bandwidth of the channel).

Figure 14:
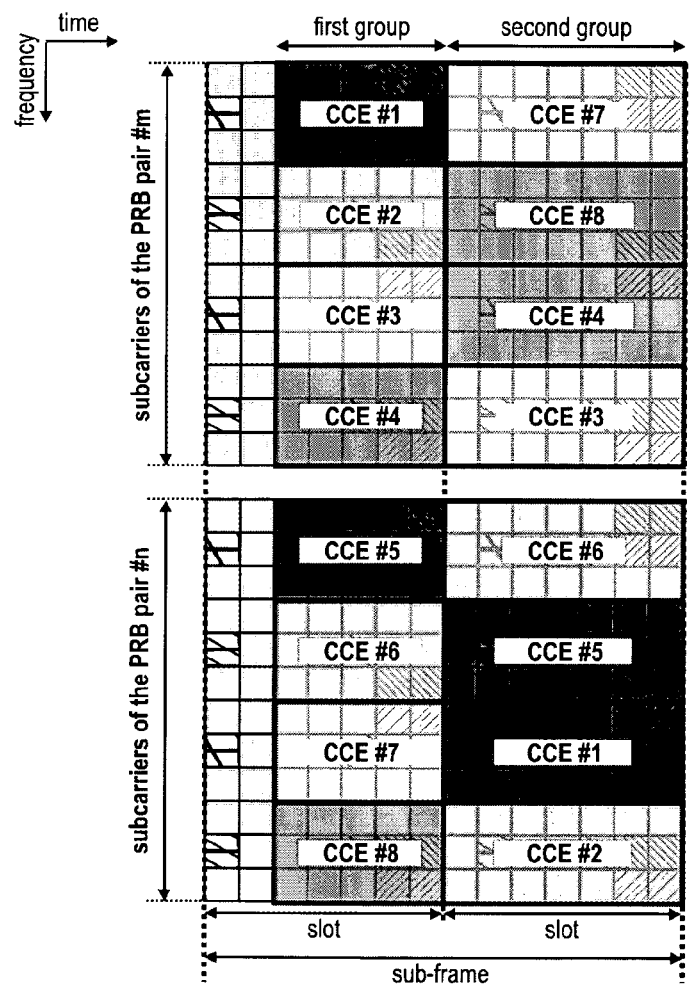
FIG. 14 shows an exemplary combination of pairs of sub-control channel elements (sub-CCEs) of FIG. 11 to form eight control channel elements (CCEs) that allow for a localized and distributed mapping of the R-PDCCH information according to an embodiment of the invention, FIG. 15 exemplifies another division of two physical resource block pairs #m and #n of a R-PDCCH region into sixteen sub-control channel elements (sub-CCEs) according to an exemplary embodiment of the invention.

One advantage of the use of sub-control channel elements is their flexibility in combining same according to a known scheme. This may for example allow the transmitting apparatus to switch between localized and distributed mapping of the PDCCH information of the receiving apparatus to the R-PDCCH region. Furthermore, by a smart combination of the sub-control channel elements, also a simultaneous localized and distributed mapping can be realized, which may be advantage if plural receiving apparatuses have the same or overlapping R-PDCCH regions. FIG. 14 shows an exemplary combination of pairs of sub-control channel elements (sub-CCEs) of FIG. 11 to form eight control channel elements (CCEs) allowing fro a localized and a distributed mapping of the R-PDCCH information according to an embodiment of the invention. A smart combination of sub-CCEs may allow to re-use physical resource blocks for other purposes, e.g. PDSCH transmissions, if none of the control channel elements are used for mapping a R-PDCCH information.

The control channel elements of FIG. 14 are obtained by a combination of sub-control channel element pairs as shown in Table 5.

TABLE 5

| Control Channel Element | Sub-control channel element of first group | Sub-control channel element of second group | Resource block pairs utilized |
|---|---|---|---|
| CCE #1 | Sub-CCE #1 | Sub-CCE #15 | PRB pairs #m & #n |
| CCE #2 | Sub-CCE #2 | Sub-CCE #16 | PRB pairs #m & #n |
| CCE #3 | Sub-CCE #3 | Sub-CCE #12 | PRB pair #m |
| CCE #4 | Sub-CCE #4 | Sub-CCE #11 | PRB pair #m |
| CCE #5 | Sub-CCE #5 | Sub-CCE #14 | PRB pair #n |
| CCE #6 | Sub-CCE #6 | Sub-CCE #13 | PRB pair #n |
| CCE #7 | Sub-CCE #7 | Sub-CCE #9 | PRB pairs #m & #n |
| CCE #8 | Sub-CCE #8 | Sub-CCE #10 | PRB pairs #m & #n |

Using the mapping scheme shown in FIG. 14 and Table 5, for example, a donor eNodeB could assign two relay nodes the same R-PDCCH region and—assuming a CCE aggregation size of four—map the PDCCH information of one relay node in a localized fashion and the PDCCH information of the other relay node in a distributed fashion to the R-PDCCH resources.

Figure 15:
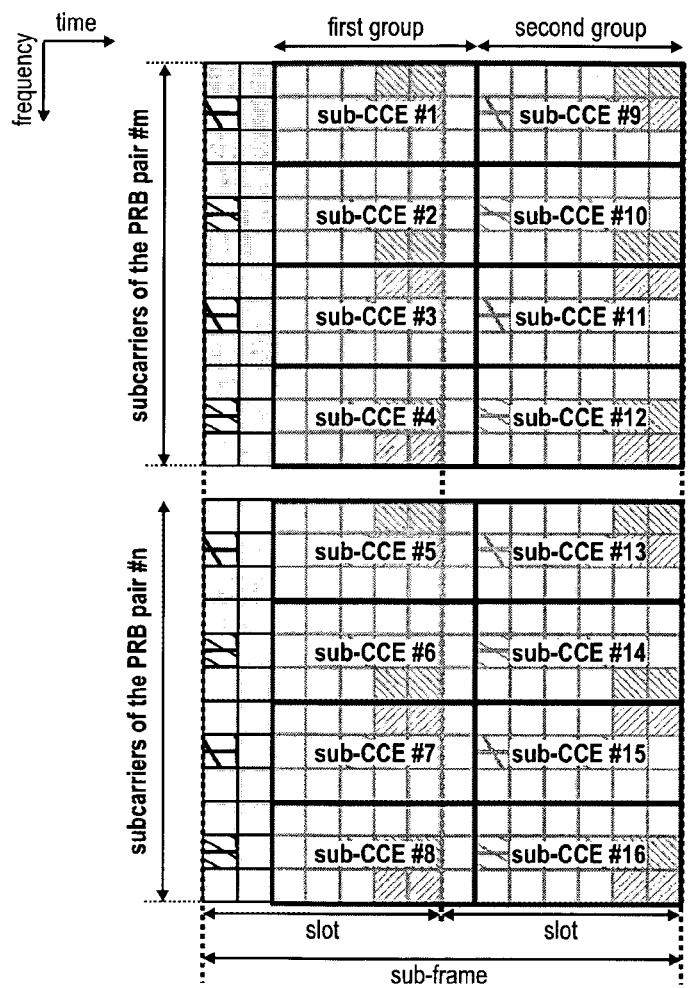

FIG. 15 exemplifies another division of two physical resource block pairs #m and #n of a R-PDCCH region into 16 sub-control channel elements (sub-CCEs) according to an exemplary embodiment of the invention. The example shown in FIG. 15 is similar to that of FIG. 11 described above, except for the sub-control elements not being divided in the time domain at the slot boundaries of the sub-frame. Instead, in this example, the $N_{symb}^{R-PDCCH}$ OFDM symbols in the time domain are evenly distributed to the respective first group and second group of sub-control channel elements. The sub-control channel elements in the first group thus have either $k_1=13$ or $k_2=15$ resource elements for conveying the control information, i.e. which are not used for reference signals. The sub-control channel elements in the second group have either $l_1=12$ or $l_2=14$ resource elements for conveying the control information, which again yields a control channel element size of $j=k_1+l_2=k_2+l_1=27$ resource elements that are available to convey the PDCCH information for the receiving apparatus.

Figure 16:
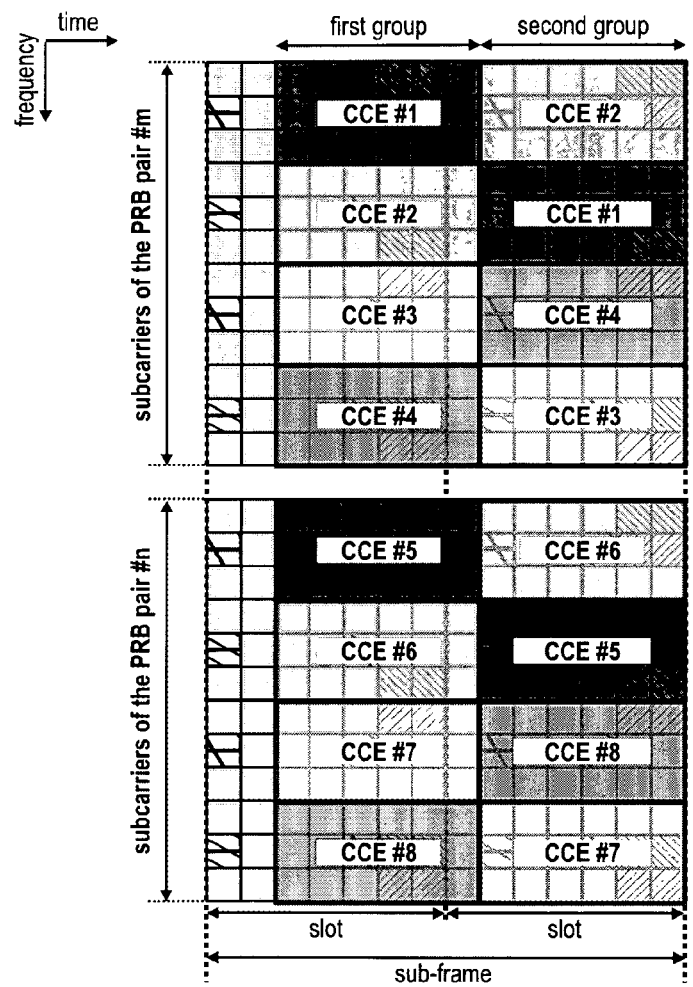
FIG. 16 shows another exemplary combination of pairs of sub-control channel elements (sub-CCEs) of FIG. 15 to form eight control channel elements (CCEs) that allow for a localized mapping of the R-PDCCH information according to an embodiment of the invention, FIG. 17 exemplifies a division of two physical resource block pairs #m and #n of a R-PDCCH region of a MBSFN sub-frame into sub-control channel elements (sub-CCEs) according to an exemplary embodiment of the invention, FIG. 18 exemplifies another division of two physical resource block pairs #m and #n of a R-PDCCH region into eight sub-control channel elements (sub-CCEs) according to an exemplary embodiment of the invention.

FIG. 16 shows an exemplary combination of pairs of sub-control channel elements (sub-CCEs) of FIG. 15 to form 8 control channel elements (CCEs) using a localized mapping of the R-PDCCH information according to an embodiment of the invention. A distributed mapping of the R-PDCCH information may be obtained in a similar fashion as shown in FIG. 13 and as has been described above. Also for the exemplary division of the R-PDCCH region as shown in FIG. 16, the control channel elements may be formed as described with respect to FIGS. 12 to 14 and Table 2 to Table 5 above.

Figure 17:
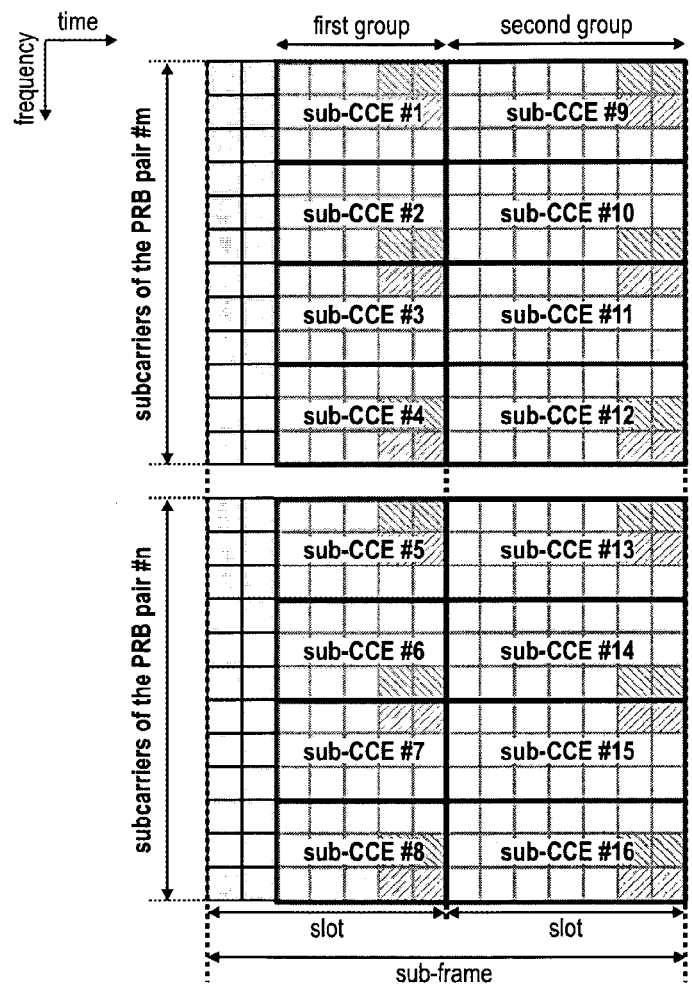

While the example with reference to FIG. 11 to 16 have been exemplified using a normal sub-frame as known from 3GPP-LTE (Release 8), the same divisions and combinations as outlined with respect to FIGS. 12 to 14 and Table 2 to Table 5 above may be used for a MBSFN sub-frame as shown in FIG. 9. FIG. 17 exemplifies a division of two physical resource block pairs #m and #n of a R-PDCCH region of a MBSFN sub-frame into sub-control channel elements (sub-CCEs) according to an exemplary embodiment of the invention. Essentially, the difference to the normal division of the normal sub-frame as discussed with respect to FIG. 11 and FIG. 16 above is that the MBSFN sub-frame does not comprise common reference signals. Hence, in the exemplary division of the MBSFN sub-frame into sub-control channel elements the size of the sub-control channel elements in the first group is either $k_1=11$ or $k_2=13$ resource elements for conveying the control information, i.e. which are not used for reference signals. The sub-control channel elements in the second group have either $l_1=17$ or $l_2=19$ resource elements for conveying the control information, which yields a control channel element size of $j=k_1+l_2=k_2+l_1=30$ resource elements that are available to convey the PDCCH information for the receiving apparatus.

It should be further noted that the above outlined division of the R-PDCCH region in the frequency and time domain may also be applied in scenarios, where there is no control channel region provided in the first OFDM symbols of the sub-frame, as for example shown in FIG. 28. As one may still assume the reference signal pattern to be unchanged a division in the frequency domain into blocks of $N_{SC}^{CCE}=3$ appears feasible to again obtain sub-control channel elements in the first group that have either $k_1$ or $k_2$ resource elements for conveying the control information, and sub-control channel elements in the second group that have either $l_1$ or $l_2$ resource elements for conveying the control information. This way, the control channel elements can be easily formed by pairs of sub-control channel elements from the first and second group, so that a control channel element size of $k_1+l_2=k_2+l_1$, is obtained (where $k_1 \neq k_2$ and $l_1 \neq l_2$). Furthermore, also in cases where the R-PDCCH region is not immediately starting after the control channel region (PDCCH region), as shown in FIG. 27, the same division of the R-PDCCH region as outlined above with respect to FIG. 11 to 17 may be used.

In the previous examples a division of the control channel region in time domain and frequency domain has been used. Other embodiments encompass the division of the control channel region in frequency domain only. FIG. 18 exemplifies another division of two physical resource block pairs #m and #n of a R-PDCCH region into eight sub-control channel elements (sub-CCEs) according to an exemplary embodiment of the invention using a FDM approach. The R-PDCCH region is divided into blocks of $N_{SC}^{CCE}=3$ subcarriers, so that overall, there are eight sub-control channel elements obtained.

Each sub-channel element spans $N_{SC}^{CCE}=3$ subcarriers in the frequency domain and all $N_{symb}^{R\text{-}PDCCH}$ OFDM symbols of the R-PDCCH region in the time domain. Again, pairs of the sub-control channel elements #1 to #8 are combined to respective control channel elements, such that all four control channel elements resulting from this combination are equal in size. The size of the sub-control channel elements is either $k_1=25$ (sub-CCEs 1#, #4, #5, #8) or $k_2=27$ (sub-CCEs #2, #3, #6, #7) resource elements for conveying the control information, i.e. which are not used for reference signals. Accordingly, by combining sub-control channel elements of size $k_1=25$ and $k_2=27$, the resulting control channel elements yield a constant size of 52 resource elements for elements for conveying the control information. FIG. 19 and FIG. 20 show exemplary combinations of pairs of sub-control channel elements (sub-CCEs) of FIG. 18 to form the four resulting control channel elements (CCEs) facilitating a localized, respectively distributed. Table 6 exemplifies the sub-CCE combinations of the structure of the R-PDCCH region of FIG. 19. The two sub-control channel elements of the same physical resource block pairs are combined respectively to obtain a localized mapping of the PDCCH information.

TABLE 6

| Control Channel Element | Sub-control channel element of first group | Sub-control channel element of second group | Resource block pairs utilized |
|---|---|---|---|
| CCE #1 | Sub-CCE #1 | Sub-CCE #2 | PRB pair #m |
| CCE #2 | Sub-CCE #3 | Sub-CCE #4 | PRB pair #m |
| CCE #3 | Sub-CCE #5 | Sub-CCE #6 | PRB pair #n |
| CCE #4 | Sub-CCE #7 | Sub-CCE #8 | PRB pair #n |

Figure 20:
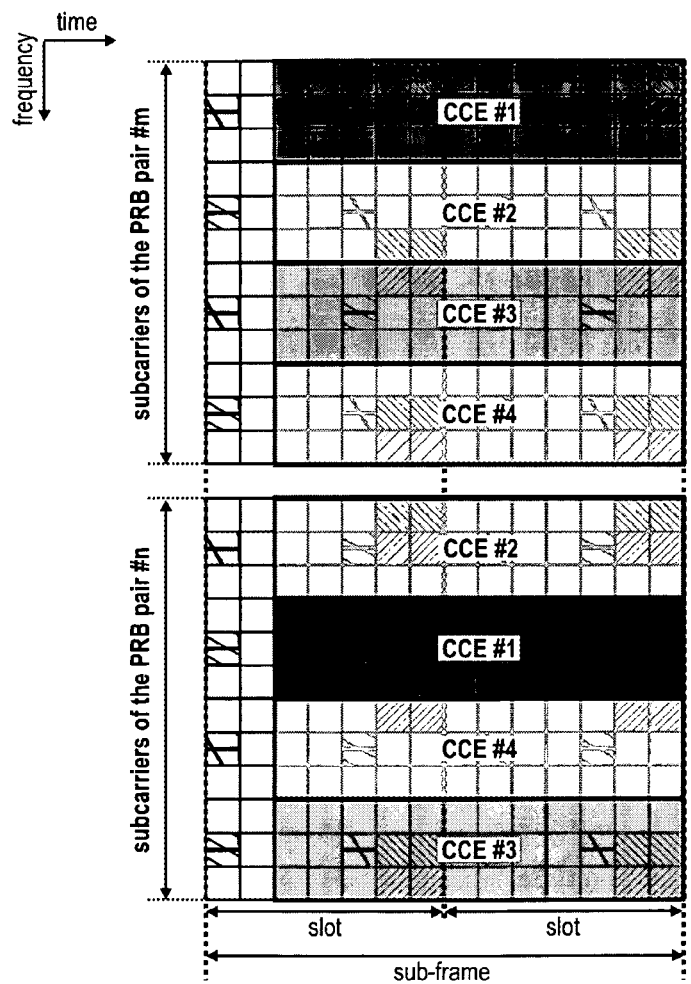

Table 7 exemplifies the sub-CCE combinations of the structure of the R-PDCCH region of FIG. 20. The two sub-control channel elements of the different physical resource block pairs are combined respectively to obtain a distributed mapping of the PDCCH information.

TABLE 7

| Control Channel Element | Sub-control channel element of first group | Sub-control channel element of second group | Resource block pairs utilized |
|---|---|---|---|
| CCE #1 | Sub-CCE #1 | Sub-CCE #5 | PRB pairs #m & #n |
| CCE #2 | Sub-CCE #2 | Sub-CCE #6 | PRB pairs #m & #n |
| CCE #3 | Sub-CCE #3 | Sub-CCE #7 | PRB pairs #m & #n |
| CCE #4 | Sub-CCE #4 | Sub-CCE #8 | PRB pairs #m & #n |

Figure 19:
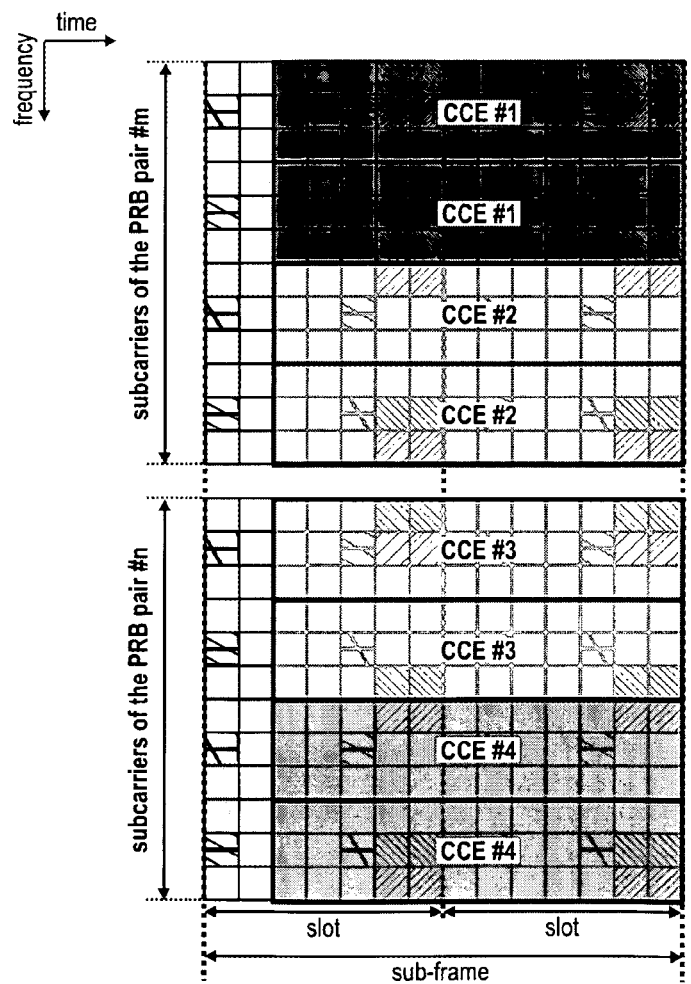
FIGS. 19 & 20 shows exemplary combinations of pairs of sub-control channel elements (sub-CCEs) of FIG. 18 to form four control channel elements (CCEs) using a localized, respectively distributed.

Alternatively, for CCE aggregation sizes larger than 1, CCEs as shown in FIG. 19 and Table 6 that are located on different physical resource block pairs could be used for signaling the PDCCH information in a distributed fashion.

As mentioned above, the physical resource block pairs #m and #n may or may not be adjacent to each other within the frequency domain. Furthermore, in a likewise fashion, also R-PDCCH regions comparing more than two physical resource block pairs may be structured into control channel elements.

Figure 21:
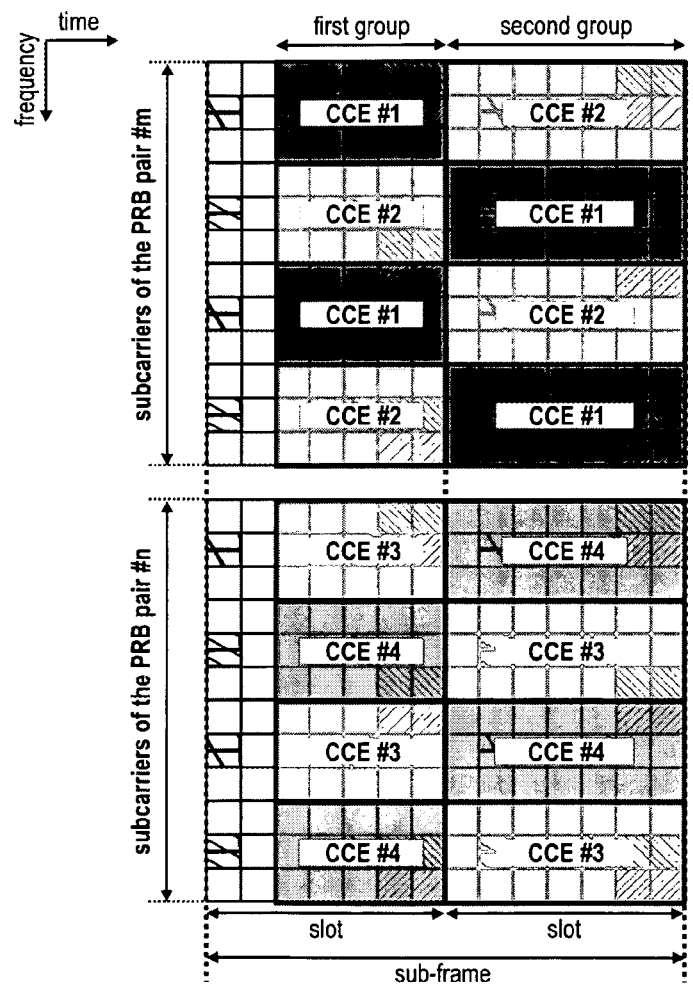
FIGS. 21 & 22 show exemplary combinations of pairs of sub-control channel elements (sub-CCEs) of FIG. 11 to form four control channel elements (CCEs) using a localized, respectively distributed mapping of the R-PDCCH information according to an embodiment of the invention, FIG. 23 exemplifies a further division of two physical resource block pairs #m and #n of a R-PDCCH region of a normal sub-frame into 8 sub-control channel elements (sub-CCEs) according to an exemplary embodiment of the invention.
Figure 22:
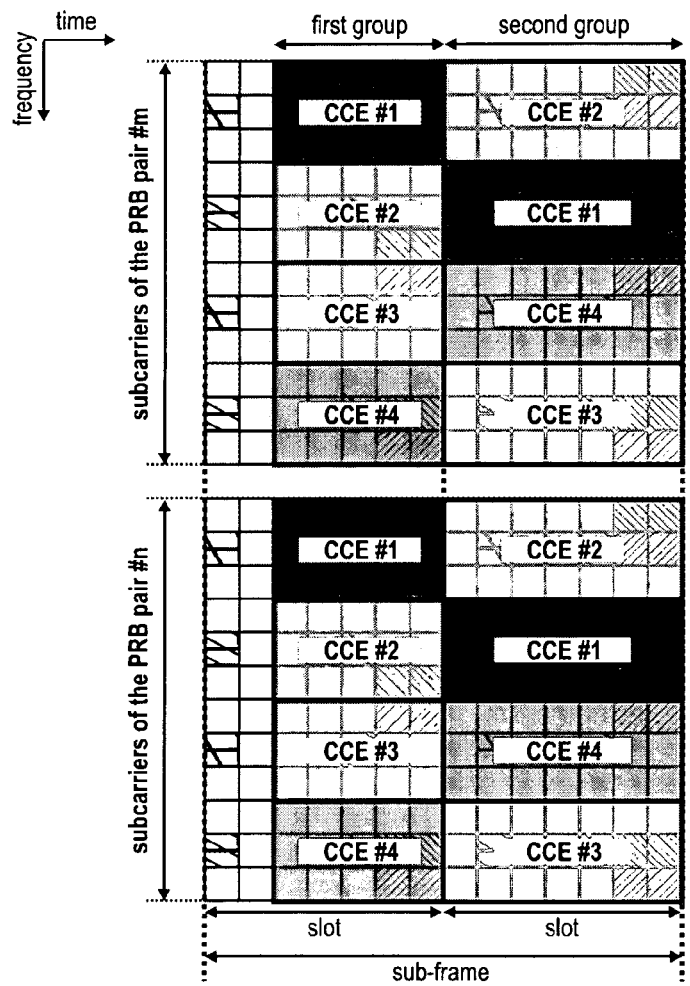

Furthermore, in another exemplary embodiment of the invention shows how more than two sub-control channel elements may be combined into control channel elements. This exemplary embodiment is assuming the sub-control channel division as shown in FIG. 11. FIGS. 21 and 22 show exemplary combinations of pairs of sub-control channel elements (sub-CCEs) of FIG. 11 to form four control channel elements (CCEs) using a localized, respectively distributed mapping of the R-PDCCH information according to an embodiment of the invention. In this example, four sub-control channel elements are combined to form four control channel elements of equal size. Table 8 shows the sub-control channel elements that form the respective four control channel elements for the localized mapping of FIG. 21. Also in this example all control channel elements are formed by sub-control channel elements of the same physical resource block pair.

TABLE 8

| Control Channel Element | Sub-control channel element 1 of first group | Sub-control channel element 2 of first group | Sub-control channel element 3 of second group | Sub-control channel element 4 of second group |
|---|---|---|---|---|
| CCE #1 | Sub-CCE #1 | Sub-CCE #3 | Sub-CCE #10 | Sub-CCE #12 |
| CCE #2 | Sub-CCE #2 | Sub-CCE #4 | Sub-CCE #9 | Sub-CCE #11 |
| CCE #3 | Sub-CCE #5 | Sub-CCE #7 | Sub-CCE #14 | Sub-CCE #16 |
| CCE #4 | Sub-CCE #6 | Sub-CCE #8 | Sub-CCE #13 | Sub-CCE #15 |

Table 9 shows the sub-control channel elements that form the respective four control channel elements for the distributed mapping of FIG. 22. For obtaining a distributed mapping, the sub-control channel elements that form a respective control channel element are located on distinct physical resource block pairs.

TABLE 9

| Control Channel Element | Sub-control channel element 1 of first group | Sub-control channel element 2 of first group | Sub-control channel element 3 of second group | Sub-control channel element 4 of second group |
|---|---|---|---|---|
| CCE #1 | Sub-CCE #1 | Sub-CCE #5 | Sub-CCE #10 | Sub-CCE #14 |
| CCE #2 | Sub-CCE #2 | Sub-CCE #6 | Sub-CCE #9 | Sub-CCE #13 |
| CCE #3 | Sub-CCE #3 | Sub-CCE #7 | Sub-CCE #12 | Sub-CCE #16 |
| CCE #4 | Sub-CCE #4 | Sub-CCE #8 | Sub-CCE #11 | Sub-CCE #15 |

Figure 23:
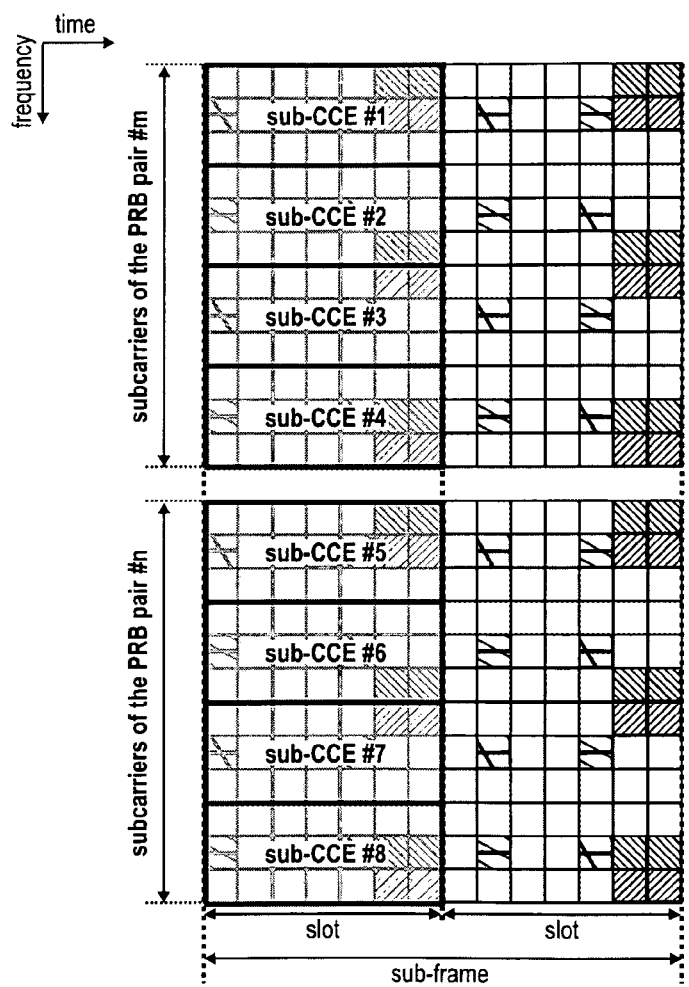
Figure 24:
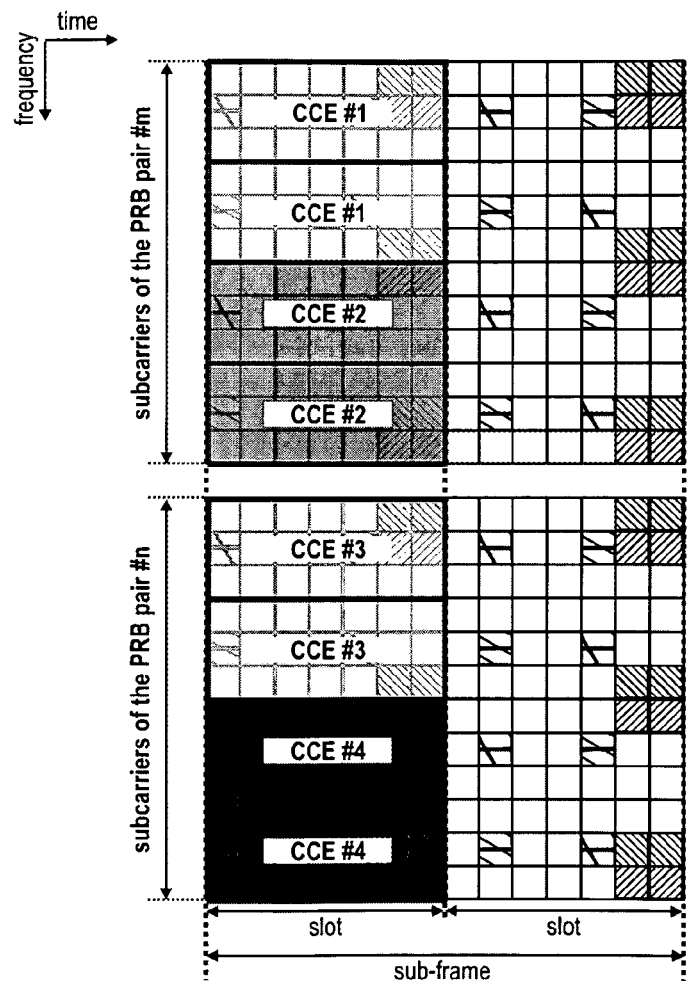
FIGS. 24 & 25 show exemplary combinations of pairs of sub-control channel elements (sub-CCEs) of FIG. 23 to form four control channel elements (CCEs) using a localized, respectively distributed mapping of the R-PDCCH information according to an embodiment of the invention.
Figure 25:
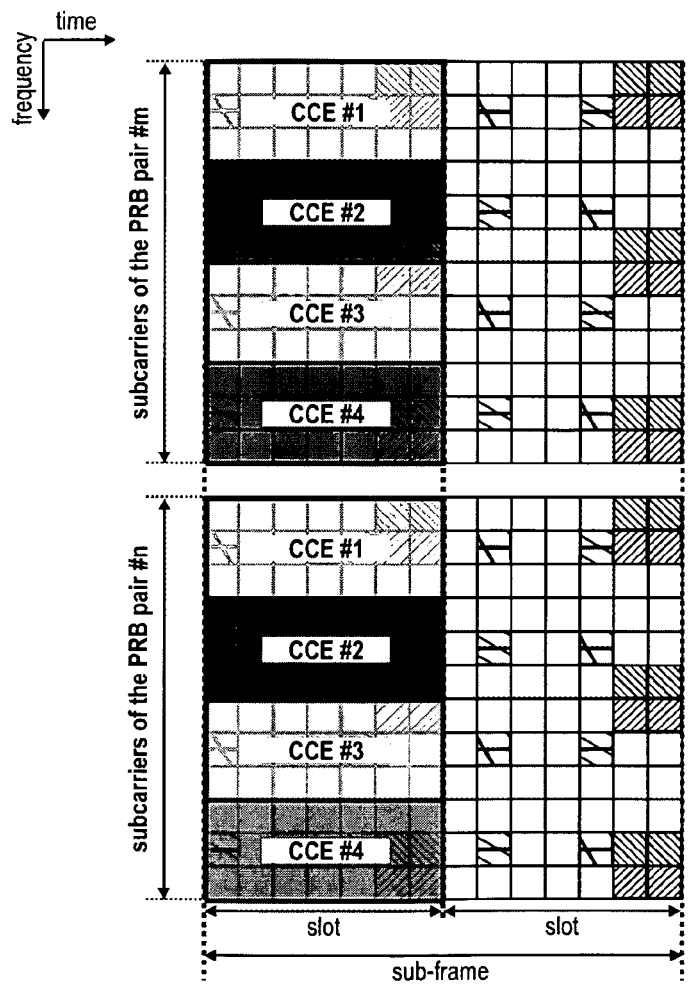

FIG. 23 shows another division of a control channel region within a sub-frame in a FDM fashion according to a further exemplary embodiment of the invention. In this example—in line with the example shown in FIG. 29 discussed previously herein—, it is assumed that the sub-frame do not contain a PDCCH region within the firsts OFDM symbols of the sub-frame. Instead, a PDCCH region carrying the PDCCH information for the receiving apparatus is assigned to the receiving apparatus (e.g. a user equipment or a relay node) by the transmitting apparatus (e.g. base station or relay node). The PDCCH regions of the receiving apparatus(es) within a radio cell controlled by the transmitting apparatus may overlap or may even be identical. The PDDCH region may be considered a search space in which the respective receiving apparatus is expecting to receive the control signaling (e.g. downlink and/or uplink resource assignments) from the transmitting apparatus.

In this exemplary embodiment on the invention, the PDCCH region is spanning the OFDM symbols of the first slot of the sub-frame. Hence, $N_{symb}^{R\text{-}PDCCH}=N_{symb}$ in this exemplary embodiment. The PDCCH region of the receiving apparatus is split in the frequency domain in blocks of $N_{SC}^{CCE}=3$ subcarriers, so that overall, there are eight sub-control channel elements obtained by the division. Each sub-channel element spans $N_{SC}^{CCE}=3$ subcarriers in the frequency domain and all $N_{symb}^{R\text{-}PDCCH}$ OFDM symbols of the PDCCH region in the time domain.

Again, pairs of the sub-control channel elements #1 to #8 are combined to respective control channel elements, such that all four control channel elements resulting from this combination are equal in size. The size of the sub-control channel elements is either $k_1=15$ (sub-CCEs 1#, #4, #5, #8) or $k_2=17$ (sub-CCEs #2, #3, #6, #7) resource elements for conveying the control information, i.e. which are not used for reference signals. Accordingly, by combining sub-control channel elements of size $k_1=15$ and $k_2=17$, the resulting control channel elements yield a constant size of 32 resource elements for elements for conveying the control information. The sub-control channel elements may be combined pair-wise, by combining sub-control elements of sizes $k_1=15$ and $k_2=17$ with each other in a similar fashion as has been discussed above with respect to FIG. 19 and FIG. 20 as well as Table 6 and Table 7.

In the previous paragraphs, several different exemplary embodiments of the structure of a R-PDCCH region and PDCCH region for signaling PDCCH information from a transmitting apparatus to a receiving apparatus have been discussed. In the following, the operation of the transmitting apparatus and the receiving apparatus will be described in further detail. The transmitting apparatus may be either a base station (e.g. a eNodeB) or a relay node. The receiving apparatus may be a relay node or a user equipment. Furthermore it should be noted that the transmitting apparatus may of course serve more than one receiving apparatus in its coverage area and comprises a scheduling function for assigning uplink or downlink resources to the transmitting apparatus(es) by means of signaling PDCCH information on the (R-)PDCCH region.

As discussed above the transmitting assigning to a receiving apparatus a control channel region ((R-)PDCCH region) within sub-frames for signaling PDCCH information to the receiving apparatus. The (R-)PDCCH region is structured into control channel elements according to one of the various embodiments of the invention discussed above. The physical resources of the (R-)PDCCH region may be configured on dynamically or semi-statically or may be predefined. For a semi-static configuration the transmitting apparatus may use radio resource control signaling, i.e. may send the parameters that describe the time and frequency resource of the (R-)PDCCH region to the receiving apparatus by means of an RRC signaling message. The (R-)PDCCH region may also be configured by the transmitting apparatus by means of system information broadcast in the radio cell of the transmitting apparatus. For example, the configuration information may be sent in one of the system information blocks broadcast by the transmitting apparatus. Another possibility is to statically define the R-PDCCH region, for example by pre-defining it in a specification.

In one embodiment the configuration information made available to the receiving apparatus include an indication of the physical resource block pairs that define the (R-)PDCCH region. If the extend of the (R-)PDCCH region in the time domain is not predefined or implicit from sub-frame boundaries or other parameters such as the PCFICH value, the configuration information may further include an indication of the OFDM symbols of the sub-frame that define the (R-)PDCCH region in the time domain. For example, the transmitting apparatus may indicate in the configuration information the symbol index $n_{start}^{R\text{-}PDCCH}$ of the OFDM symbol at which the first symbol of the (R-)PDCCH region. Optionally, the configuration information may also comprise a symbol index $n_{end}^{R\text{-}PDCCH}$ for indicating the last symbol of the (R-)PDCCH region or the size of (R-)PDCCH region in terms of number of OFDM symbols.

The transmitting apparatus generates a sub-frame to be sent in the downlink. The sub-frame may comprise control information and user data of multiple receiving apparatuses. The sub-frame as such spans all downlink component carriers available to the base station, but is logically divided into plural OFDM symbols in the time domain on respective component carriers in the frequency domain. The component carriers in the downlink span a certain range of sub-bands (subcarriers) that define the bandwidth of the respective component carrier. The sub-frame structure may be as such structured as shown in FIG. 8 or FIG. 9 and comprises several reference signals that are transmitted on respective resource elements in a pre-determined pattern.

The transmitting apparatus generates PDCCH information for one or more receiving apparatuses. The PDCCH information may be provided in form of a know downlink control information (DCI) format. The transmitting apparatus maps the PDCCH information for transmission to one or more control channel elements in the (R-)PDCCH region that is configured for a respective receiving apparatus within a sub-frame on the downlink. Please note that the transmitting apparatus may use a distributed or localized mapping scheme for mapping the PDCCH information to the (R-)PDCCH region using one of the various (R-)PDCCH region structures as outlined above. In one example, the PDCCH information is mapped to $2^i$ of the control channel elements defined in the (R-)PDCCH region, wherein $i \in \{0,1,2,3\}$ or $i \in \{0,1,2,3,4\}$.

In order to be able to address the different PDCCH information that is signaled by a transmitting apparatus to the correct receiving apparatus, a receiving apparatus-specific (i.e. UE-specific or relay node-specific) RNTI (Radio Network Terminal Identifier) is implicitly included in the PDCCH information signaled in the (R-)PDDCH region by masking the CRC of the encoded PDCCH information with the RNTI. On the receiving apparatus side, if decoding of the coded PDCCH information is successful, the receiving apparatus detects the PDCCH information to be destined to it by checking whether the CRC on the decoded PDCCH information using the "unmasked" CRC (i.e. after removing the masking using the RNTI) is successful. Please note that the masking of the CRC code is performed by scrambling the CRC with the RNTI.

Hence, the CRC of coded PDCCH information is scrambled/masked with a respective RNTI of the transmitting apparatus and the coded PDCCH information and the masked CRC code (CRC attachment) is mapped to the CCEs within the (R-)PDCCH region on the downlink as outlined in one of the different embodiments of the (R-)PDCCH region structure above. Finally the transmitting apparatus transmits the sub-frame on the downlink.

The receiving apparatuses attempt to detect the control information in their assigned (R-)PDCCH region using so-called "blind decoding". This means that there is no associated control signaling that would indicate the CCE aggregation size or modulation and coding scheme for the PDCCH information signaled in the downlink, but the user equipments/relay nodes test for all possible combinations of CCE aggregation sizes and modulation and coding schemes, and confirms that successful decoding of a PDCCH information based on the RNTI that is used to mask the CRC field that is attached to the PDCCH information.

The receiving apparatuses may be assumed to perform a blind detection on a set of (R-)PDCCH candidates for the PDCCH information in every non-DRX sub-frame, where blind detection implies attempting to decode each of the (R-)PDCCH candidate in the set according to some set of the monitored (R-)PDCCH formats (Downlink Control Information (DCI) formats). The set of (R-)PDCCH candidates to monitor may be defined in terms of search spaces, where a search space at each CCE aggregation level $L \in \{1,2,4,8\}$ is defined by a set of PDCCH candidates. The use of search spaces may be particularly useful in situations where multiple receiving apparatuses share a common (R-)PDCCH region of larger extend, so that it may be desirable to limit the search for PDCCH information by the respective receiving apparatuses to respective sub-regions (i.e. the search space) to thereby reduce the number of blind decoding attempts.

As explained before, to limit complexity of the blind decoding, the receiving apparatuses may be allocated to one or more search spaces in which they expect their PDCCH information. Within the same (R-)PDCCH region, two types of search spaces may be defined: one is a localized search space and the other is distributed a search spaces. In localized search space, at each CCE aggregation level, the CCEs composing the PDCCH candidates are more localized in frequency domain. In distributed search space, at each aggregation level, the CCEs composing the PDCCH candidates are distributed in frequency domain. A receiving apparatus may be configured to monitor a localized search space only, a distributed search space only or a localized and distributed search space simultaneously. Which search space(s) are to be monitored by a respective receiving apparatus may be for example configured by the transmitting apparatus by means of RRC signaling, The receiving apparatus blind decodes the payload size of the (R-)PDCCH message and uses its RNTI to descramble the CRC. Based on the descrambled CRC information, the receiving apparatus determines whether the message payload (i.e. decoded PDCCH information) has been successfully decoded and is destined to the receiving apparatus.

The PDCCH information for the receiving apparatus may for example contain an uplink and/or downlink resource assignment for the receiving apparatus. In one embodiment of the invention, the resource assignments for uplink and downlink indicate the assigned physical resources on downlink, respectively uplink, in terms of physical resource blocks, the modulation and coding scheme of the transport block to be received/transmitted on the indicated downlink/uplink resources, and the transport block size. Furthermore, in case the transport block is transmitted using a HARQ protocol, further HARQ related information such as the new data indicator (NDI) and/or the HARQ process identifier may also be included in the resource assignments. If cross carrier scheduling and carrier aggregation is employed, the resource assignments may also comprise a carrier identifier field (CIF) that indicates the downlink respectively uplink component carrier on which the physical resources are assigned.

In case of a downlink resource assignment, the resources for the transmission of the transport block may be transmitted on the same downlink sub-frame as the downlink resource assignment. Accordingly, the receiving apparatus will try to receive and decode the downlink transport block. In case of an uplink resource assignment, the receiving apparatus generates a transport block according to the parameters (modulation and coding scheme and transport block size) and transmits the transport block on the assigned uplink resources.

Another embodiment of the invention is related to the allocation of the physical resource block pairs that belong to the (R-)PDCCH region to the receiving apparatus. In this exemplary embodiment, it is proposed to use an allocation method similar to the (Distributed Virtual Resource Block) DVRB allocation method known from 3GPP LTE (Release 8). In 3GPP LTE (Release 8), four types of resource allocation are used for allocation physical resources in the PDSCH region of sub-frame. One of these four allocation types is the DVRB allocation. DVRB allocation is advantageous for distributed mapping of small data.

Normally (R-)PDCCH region for each receiving apparatus is very small, only a couple of resource blocks. Therefore, it is proposed in this embodiment a resource allocation scheme similar to DVRB is used for the allocation of the physical resource block pairs that belong to the (R-)PDCCH region. In DVRB allocation, a number of contiguous Distributed Virtual Resource Blocks (DVRBs) is allocated to the scheduled receiving apparatus. The DVRBs are identified by their indices. For transmission, the DVRBs are mapped to "real" physical resource blocks according to a given mapping rule. The mapping between DVRBs to physical resource blocks as defined in the 3GPP TS 23.213, "Physical layer procedures (Release 8)", version 8.8.0, section 7.1.6 (available at http://www.3gpp.org and incorporated herein by reference). According to this embodiment, the (R-)PDCCH region resources may also be indicated as virtual resource blocks that are mapped to physical resource blocks for transmission. The mapping follows some rules so that DVRB index is distributed across the bandwidth and achieve $4^{th}$ order diversity. In order to support localized and distributed mapping simultaneously, it may be advantageous to allocated (R-)PDCCH region on distributed physical resource blocks. DVRB allocation for (R-)PDCCH region may ensure that the resource blocks within the (R-)PDCCH region are distributed in the frequency domain.

Another embodiment of the invention relates to the implementation of the above described various embodiments using hardware and software. It is recognized that the various embodiments of the invention may be implemented or performed using computing devices (processors) that are suitably controlled by executable instructions that cause the computing device to perform the functions according to the different embodiments of the invention described herein.

For example the transmitting apparatus's scheduling function, the signaling mechanisms for configuring the (R-)PDCCH region, the sub-frame generation, the mapping of PDCCH information to appropriate OFDM symbols of the (R-)PDCCH region in the sub-frame according to given mapping rules, etc. may be for example implemented in hardware and/or software.

Similarly, the processing of the received sub-frames at the receiving apparatuses may at least partly implemented in hardware and/or software. A computing device or processor may for example be general purpose processors, digital signal processors (DIP), application specific integrated circuits (ASICS), field programmable gate arrays (FAGAN) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer-readable storage media, for example RAM, EPROM, EPSOM, flash memory, registers, hard disks, CD-ROM, DVD, etc.

Most of the embodiments have been outlined in relation to a 3GPP-based architecture of a communication system and the terminology used in the previous sections mainly relates to the 3GPP terminology. However, the terminology and the description of the various embodiments with respect to 3GPP-based architectures are not intended to limit the principles and ideas of the inventions to such systems only.

Also the detailed explanations given in the Technical Background section above are intended to better understand the mostly 3GPP specific exemplary embodiments described herein and should not be understood as limiting the invention to the described specific implementations of processes and functions in the mobile communication network. Nevertheless, the concepts and sub-frame structures proposed herein may be readily applied in the architectures described in the Technical Background section. Furthermore, the concept of the invention may be also readily used in the LTE-A RAN currently discussed by the 3GPP.

In the previous paragraphs various embodiments of the invention and variations thereof have been described. It would be appreciated by a person skilled in the art that numerous variations and/or modifications may be made to the present invention as shown in the specific embodiments without departing from the spirit or scope of the invention as broadly described.

The invention claimed is:

1. A transmission apparatus comprising:
a configuring circuitry, which in operation, configures a plurality of control channel elements (CCEs) in an extended-physical downlink control channel (extended PDCCH) defined in a physical downlink shared channel (PDSCH) region of a subframe, each of the plurality of CCEs including two sub-CCEs that have different numbers of resource elements (REs), excluding REs configured to map reference signals, in both of a localized mapping scheme where the two sub-CCEs belong to a single resource block pair (RB pair) and a distributed mapping scheme where the two sub-CCEs belong to two different RB pairs;
a mapping circuitry, which in operation, maps downlink control information to at least one of the plurality of CCEs configured in the extended PDCCH; and
a transmitter, which, in operation, transmits the mapped downlink control information.

2. The transmission apparatus according to claim 1, wherein the two sub-CCEs are selected from a plurality of sub-CCEs that are generated by dividing each of a plurality of RB pairs by frequency and time division.

3. The transmission apparatus according to claim 1, wherein a number of sub-CCEs that constitute one CCE is common among the plurality of CCEs.

4. The transmission apparatus according to claim 1, wherein the two sub-CCEs belong to a single RB pair.

5. The transmission apparatus according to claim 1, wherein the two sub-CCEs belong to more than one RB pairs.

6. The transmission apparatus according to claim 1, wherein
the subframe comprises a first slot and a second slot in a time domain, and
the digital signal processing circuitry generates each of the plurality of CCEs by combining at least one sub-CCE belonging to the first slot and at least one sub-CCE belonging to the second slot.

7. The transmission apparatus according to claim 1, wherein the digital signal processing circuitry maps the downlink control information to one CCE or an aggregated several CCEs among the plurality of CCEs configured in the extended-PDCCH.

8. A transmission method comprising:
configuring a plurality of control channel elements (CCEs) in an extended-physical downlink control channel (extended PDCCH) defined in a physical downlink shared channel (PDSCH) region of a subframe, each of the plurality of CCEs including two sub-CCEs that have different numbers of resource elements (REs), excluding REs configured to map reference signals;
mapping downlink control information to at least one of the plurality of CCEs configured in the extended PDCCH, in both of a localized mapping scheme where the two sub-CCEs belong to a single resource block pair (RB pair) and a distributed mapping scheme where the two sub-CCE belongs to two different RB pairs; and
transmitting the mapped downlink control information.

9. The transmission method according to claim 8, wherein the two sub-CCEs are selected from a plurality of sub-CCEs that are generated by dividing each of a plurality of RB pairs by frequency and time division.

10. The transmission method according to claim 8, wherein a number of sub-CCEs that constitute one CCE is common among the plurality of CCEs.

11. The transmission method according to claim 8, wherein the two sub-CCEs belong to a single RB pair.

12. The transmission method according to claim 8, wherein the two sub-CCEs belong to more than one RB pairs.

13. The transmission method according to claim 8, wherein
the subframe comprises a first slot and a second slot in a time domain, and
each of the plurality of CCEs is generated by combining at least one sub-CCE belonging to the first slot and at least one sub-CCE belonging to the second slot.

14. The transmission method according to claim 8, wherein the downlink control information is mapped to one CCE or an aggregated several CCEs among the plurality of CCEs configured in the extended-PDCCH.

* * * * *